(12) United States Patent
Jaeger

(10) Patent No.: US 10,437,605 B1
(45) Date of Patent: Oct. 8, 2019

(54) CONFIGURABLE STARTUP, SHUTDOWN, REBOOT AND ISOLATION FOR APPLICATIONS IN CLOUD-BASED INFORMATION PROCESSING SYSTEMS

(71) Applicant: Virtustream IP Holding Company LLC, Bethesda, MD (US)

(72) Inventor: Peter Jaeger, Sandy Springs, GA (US)

(73) Assignee: Virtustream IP Holding Company LLC, Bethesda, MD (US)

( * ) Notice: Subject to any disclaimer, the term of this patent is extended or adjusted under 35 U.S.C. 154(b) by 294 days.

(21) Appl. No.: 15/669,608

(22) Filed: Aug. 4, 2017

(51) Int. Cl.
G06F 15/173 (2006.01)
G06F 9/4401 (2018.01)
H04L 29/08 (2006.01)
G06F 11/14 (2006.01)

(52) U.S. Cl.
CPC ............ G06F 9/4416 (2013.01); G06F 9/442 (2013.01); G06F 11/1417 (2013.01); H04L 67/025 (2013.01); H04L 67/10 (2013.01)

(58) Field of Classification Search
CPC .... G06F 9/4416; G06F 9/442; G06F 11/1417; H04L 67/025; H04L 67/10
See application file for complete search history.

(56) References Cited

U.S. PATENT DOCUMENTS

| | | | | |
|---|---|---|---|---|
| 8,543,800 B2* | 9/2013 | Arditti | ................. | G06F 9/5055 713/2 |
| 10,095,533 B1* | 10/2018 | Dravid | ...................... | G06F 9/50 |
| 2002/0147854 A1* | 10/2002 | Frazier | .................... | G06F 9/545 719/310 |
| 2011/0145806 A1* | 6/2011 | Cook | ........................ | G06F 8/65 717/170 |
| 2013/0198739 A1* | 8/2013 | Razdan | ............... | G06F 9/45558 718/1 |

(Continued)

OTHER PUBLICATIONS

EMC Corporation, "VCE VXRack System 1000 Series: Hyper-Converged Infrastructure at Scale," The Virtual Computing Environment Company, EMC Converged Platforms, Feb. 17, 2016, 3 pages.

(Continued)

*Primary Examiner* — Jonathan A Bui
(74) *Attorney, Agent, or Firm* — Ryan, Mason & Lewis, LLP

(57) ABSTRACT

An apparatus in one embodiment comprises a processing platform that includes a plurality of processing devices each comprising a processor coupled to a memory. The processing platform is configured to implement virtual resources of one or more clouds for use by applications of at least one application management domain. The processing platform further comprises an application manager configured in accordance with a multi-layer application management architecture. The application manager implements at least one of a startup procedure, a shutdown procedure, a reboot procedure and an isolation procedure for at least a portion of each of one or more of the applications. A given instance of at least one of the startup procedure, the shutdown procedure, the reboot procedure and the isolation procedure is applied to a particular designated set of controlled components. The given instance is configurable under user control so as to provide a customized version of the corresponding procedure.

20 Claims, 18 Drawing Sheets

(56) References Cited

U.S. PATENT DOCUMENTS

| | | | | |
|---|---|---|---|---|
| 2014/0100879 | A1* | 4/2014 | Kharebov | G06F 19/3418 705/3 |
| 2014/0189382 | A1* | 7/2014 | Grimes | G06F 9/00 713/310 |
| 2014/0359357 | A1* | 12/2014 | Liu | G06F 11/2273 714/27 |
| 2015/0378743 | A1* | 12/2015 | Zellermayer | G06F 9/4401 713/2 |
| 2017/0046247 | A1* | 2/2017 | Nutter | G06F 11/3664 |
| 2018/0067926 | A1* | 3/2018 | Bestfleisch | G06F 9/454 |
| 2018/0095854 | A1* | 4/2018 | Apte | G06F 3/065 |
| 2018/0203718 | A1* | 7/2018 | Kia | G06F 9/44 |

OTHER PUBLICATIONS sysdig.org, "Universal System Visibility with Native Container Support," 2015, 3 pages.

W. Felter et al., "An Updated Performance Comparison of Virtual Machines and Linux Containers," IBM Research Report, RC25482, Jul. 21, 2014, 15 pages.

EMC Corporation, "Vblock FastPath Desktop Virtualization Platform: Modernize Your Desktop with a Purpose-Built Desktop Virtualization Solution," The Virtual Computing Environment Company, vmware, 2011, 2 pages.

B. Hindman et al., "Mesos: A Platform for Fine-Grained Resource Sharing in the Data Center," Proceedings of the 8th USENIX Conference on Networked Systems Design and Implementation (NSDI), Mar.-Apr. 2011, pp. 295-308.

wordpress.com, "Virtustream xStream with App Director Service Module for SAP," The SAP Data Center of the Future, Apr. 14, 2016, 5 pages.

U.S. Appl. No. 15/195,159 filed in the name of Peter Jaeger Jun. 28, 2016 and entitled "Multi-Layer Application Management Architecture for Cloud-Based Information Processing Systems."

Solarwinds Worldwide, LLC, "Application Stack Management Bundle: Pinpoint the Root Cause of Application Problems in Seconds," http://www.solarwinds.com/application-server-management-software, 2016, 4 pages.

Zoho Corporation, "ManageEngine Applications Manager—Fact Sheet," https://download.manageengine.com/products/applications_manager/meam_fact_sheet.pdf, 2016, 4 pages.

The Apache Software Foundation, "Apache CloudStack: About," https://cloudstack.apache.org/about.html, 2016, 1 page.

Kaavo, "Application-Centric CloudResource Management," IMOD Data Sheet, http://docs.kaavo.com/Kaavo-IMOD-Fact-Sheet.pdf, 2011, 2 pages.

Morpheus Data, LLC, "Cloud Application Management for Today's Technology Leader," https://morpheus-v2-marketing-production.s3.amazonaws.com/system/SpudMedia/216/attachment/Morpheus_Overview_original.pdf, Jul. 8, 2016, 2 pages.

RightScale, Inc., "RightScale Technical Overview," http://assets.rightscale.com/uploads/pdfs/RightScale-Technical-overview.pdf, 2014, 11 pages.

Activeeon, "ProActive Cloud Automation: Your Open Automation Platform, Product Sheet," http://www.activeeon.com/resources/activeeon-productsheet-proactive-cloud-automation-en.pdf, 2016, 2 pages.

VMware, "VMware vRealize Orchestrator: Executing Complex IT Operations Faster and at Lower Cost," Datasheet, https://www.vmware.com/content/dam/digitalmarketing/vmware/en/pdf/products/vrealize/vmware-vrealize-orchestrator.pdf, Sep. 2014, 2 pages.

The Apache Software Foundation, "The Theory Behind Brooklyn," https://brooklyn.apache.org/learnmore/theory.html, 2016, 4 pages.

The Apache Software Foundation, "Apache Provisionr," http://provisionr.incubator.apache.org/index.html, 2013, 1 page.

J. Cammarata, "About Cobbler," http://cobbler.github.io/about.html, 2016, 3 pages.

Canonical Ltd., "What is Juju?," https://jujucharms.com/docs/stable/about-juju, 2016, 6 pages.

Saltstack Inc., "SaltStack Orchestration & Automation for CloudOps, ITops & DevOps at Scale," https://saltstack.com/enterprise/, 2016, 3 pages.

Empirius GmbH, "Technical Whitepaper: BlueSystemCopy for SAP," http://empirius.de/en/products/blue-systemcopy-systemcopies-automatic-and-optimized.html, Aug. 2016. 17 pages.

Libelle AG, "Libelle SystemCopy: Automated and Optimized System Copies for SAP Applications," Fact Sheet, http://www.libelle.com/fileadmin/Public/Whitepaper/FactSheet_Libelle_SystemCopy_EN.pdf, Apr. 2015, 4 pages.

Cloud Foundry Foundation, "Cloud Foundry Overview," https://docs.cloudfoundry.org/concepts/overview.html, Jul. 27, 2016, 4 pages.

Heroku Dev Center, "How Heroku Works," https://devcenter.heroku.com/articles/how-heroku-works#defining-an-application, Aug. 26, 2016, 10 pages.

Apcera Inc., "How Apcera Works," http://docs.apcera.com/introduction/apcera-usage/, Nov. 4, 2015, 4 pages.

Kubernetes, "What is Kubernetes?," http://kubernetes.io/docs/whatisk8s/, 2016, 6 pages.

UShareSoft, "UForge for Cloud Service Providers Scale. Differentiate. Make Money. Solution Sheet," https://www.usharesoft.com/resources/datasheets/uforge-cloud-providers.pdf, 2014, 2 pages.

Gigaspaces Technologies, "What is Cloudify?," http://docs/getcloudify.org/3.3.1/intro/what-is-cloudify/, 2016, 2 pages.

Cliqr Technologies, "CloudCenter Features," http://docs.cliqr.com/display/CCD42/Features, 2016, 2 pages.

Red Hat, Inc., "Ansible Tower User Guide v3.0.1," https://docs.ansible.com/ansible-tower/latest/html/userguide/ovewiew.html, 2016, 3 pages.

CHEF Software Inc., "CHEF" DataSheet, https://pages.chef.io/rs/255-VFB-268/images/chef-datasheet.pdf, Jun. 2016, 2 pages.

CFEngine, "Introduction and System Overview," https://docs.cfengine.com/lts/guide-introduction.html, Sep. 28, 2016, 5 pages.

Incontinuum, "Automated Cloud Orchestration," http://incontinuum.incontinuumsoftw.netdna-cdn.com/wp-content/uploads/2016/07/CloudController-EN-1606-BROCHURE.pdf, Jun. 2016, 4 pages.

Apprenda Inc., "What is Apprenda, Logically Speaking?" http://docs.apprenda.com/print/book/export/html/976, 2016, 4 pages.

Fluid Operations AG, "Next Generation Cloud Management," https://www.fluidops.com/en/company/post?s=2016-03-30-new-paper-available-next-generation-cloud-management, Mar. 30, 2016, 12 pages.

VMware, Inc., "VMware vCloud Air: Service Description," Datasheet, http://www.vmware.com/content/dam/digitalmarketing/vmware/en/pdf/product/vcloud-air/vmware-vcloud-air-datasheet.pdf, 2015, 4 pages.

Red Hat, Inc., "Openshift Enterprise 3.1 by Red Hat," Datasheet, https://www.openshift.com/sites/default/files/rhc-openshift-enterprise-paas-datasheet.pdf, 2015, 2 pages.

IBM Corporation Software Group, "Simplifying Cloud Management and Data Center Automation," Thought Leadership White Paper, http://www-03.ibm.com/software/products/en/ibm-cloud-orchestrator, Apr. 2014, 6 pages.

Rackspace US, Inc., "Why Rackspace: More Than a Hosting Provider. We're your Trusted Service Partner," https://www.rackspace.com/why-rackspace, 2016, 6 pages.

Hashicorp, "DevOps and the Future of infrastructure," https://www.hashicorp.com/index.html#products, 2016, 10 pages.

C3DNA Inc., "The C3DNA Platform," http://c3dna.com/product.html, 2014, 5 pages.

IT-Conductor Inc., "Application Performance Management as Service," http://itconductor.com/, 2016, 7 pages.

ElasticBox, "Adaptive Cloud Application Delivery;" https://elasticbox.com/how-it-works, 2016, 5 pages.

Hashicorp, "Why Vagrant?," https://www.vagrantup.com/docs/why-vagrant/, Jan. 19, 2016, 3 pages.

Hewlett Packard Enterprise Development LP, "Eucalyptus 4.3.0 User Guide," https://docs.eucalyptus.com/eucalyptus/4.3.0./, Sep. 23, 2016, 127 pages.

Puppet, "Explore the Value of Puppet Enterprise," https://puppet.com/resources/data-sheet/explore-value-of-puppet-enterprise, 2016, 2 pages.

(56) References Cited

OTHER PUBLICATIONS

Rackspace US, Inc., "Welcome to the Heat Documentation!," OpenStack Heat, http://docs.openstack.org/developer/heat, 2013, 5 pages.

SAP, "Soft Shutdown in SAP Application Server," SAP NetWeaver 7.3 EHP1 Documentation, https://help.sap.com/saphelp_nw73ehp1/helpdata/en/f7/cb8577bc244a25a994fc3f9c16ce66/frameset.htm, Nov. 2016, 5 pages.

* cited by examiner

CONFIGURABLE STARTUP, SHUTDOWN, REBOOT AND ISOLATION FOR APPLICATIONS IN CLOUD-BASED INFORMATION PROCESSING SYSTEMS

RELATED APPLICATION

The present application is related to U.S. patent application Ser. No. 15/195,159, filed Jun. 28, 2016 and entitled "Multi-Layer Application Management Architecture for Cloud-Based Information Processing Systems," which is incorporated by reference herein in its entirety.

FIELD

The field relates generally to information processing systems, and more particularly to techniques for managing applications in cloud-based information processing systems.

BACKGROUND

Information processing systems increasingly utilize reconfigurable virtual resources to meet changing user needs in an efficient, flexible and cost-effective manner. For example, cloud computing and storage systems implemented using virtual resources have been widely adopted. Other virtual resources now coming into widespread use in information processing systems include Linux containers. Such containers may be used to provide at least a portion of the virtualization infrastructure of a given cloud-based information processing system. However, significant challenges can arise in the management of large numbers of applications in cloud-based information processing systems. For example, coordination of multiple distinct applications on behalf of each of multiple tenants across a hybrid multi-tenant cloud can be particular challenging when using conventional arrangements. Accordingly, a need exists for improved management of applications in hybrid multi-tenant clouds as well as other types of cloud-based information processing systems. More particularly, a more flexible approach to implementation of startup, shutdown, reboot and isolation procedures in cloud-based system contexts would be highly beneficial.

SUMMARY

Illustrative embodiments of the present invention provide configurable startup, shutdown, reboot and isolation procedures implemented using multi-layer application management architectures for cloud-based information processing systems. Such procedures are well-suited for use with hybrid multi-tenant clouds and numerous other types of cloud-based information processing systems.

In one embodiment, an apparatus comprises a processing platform that includes a plurality of processing devices each comprising a processor coupled to a memory. The processing platform is configured to implement virtual resources of one or more clouds for use by applications of at least one application management domain.

The processing platform further comprises an application manager configured in accordance with a multi-layer application management architecture. The virtual resources and applications comprise respective controlled components under control of a component control layer of the multi-layer application management architecture. The applications are managed utilizing interactions between the component control layer and one or more other layers of the multi-layer application management architecture.

The application manager is further configured to implement at least one of a startup procedure, a shutdown procedure, a reboot procedure and an isolation procedure for at least a portion of each of one or more of the applications.

A given instance of at least one of the startup procedure, the shutdown procedure, the reboot procedure and the isolation procedure is applied to a particular designated set of the controlled components. The given instance is configurable under user control so as to provide a customized version of the corresponding procedure.

Illustrative embodiments can provide significant advantages relative to conventional arrangements. For example, challenges associated with implementation of startup, shutdown, reboot and isolation procedures for at least portions of multiple distinct applications for multiple tenants in hybrid multi-tenant clouds can be advantageously avoided through the use of an application manager configured in accordance with a multi-layer application management architecture as disclosed herein.

These and other illustrative embodiments described herein include, without limitation, methods, apparatus, systems, and computer program products comprising processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Numerous other system configurations are possible in other embodiments.

In the following description, the term "landscape" should be understood to refer to a set of systems.

Also, the term "application management domain" as used herein is intended to be broadly construed so as to encompass a set of things under control that are controlled by a controller of an application manager.

Figure 1:
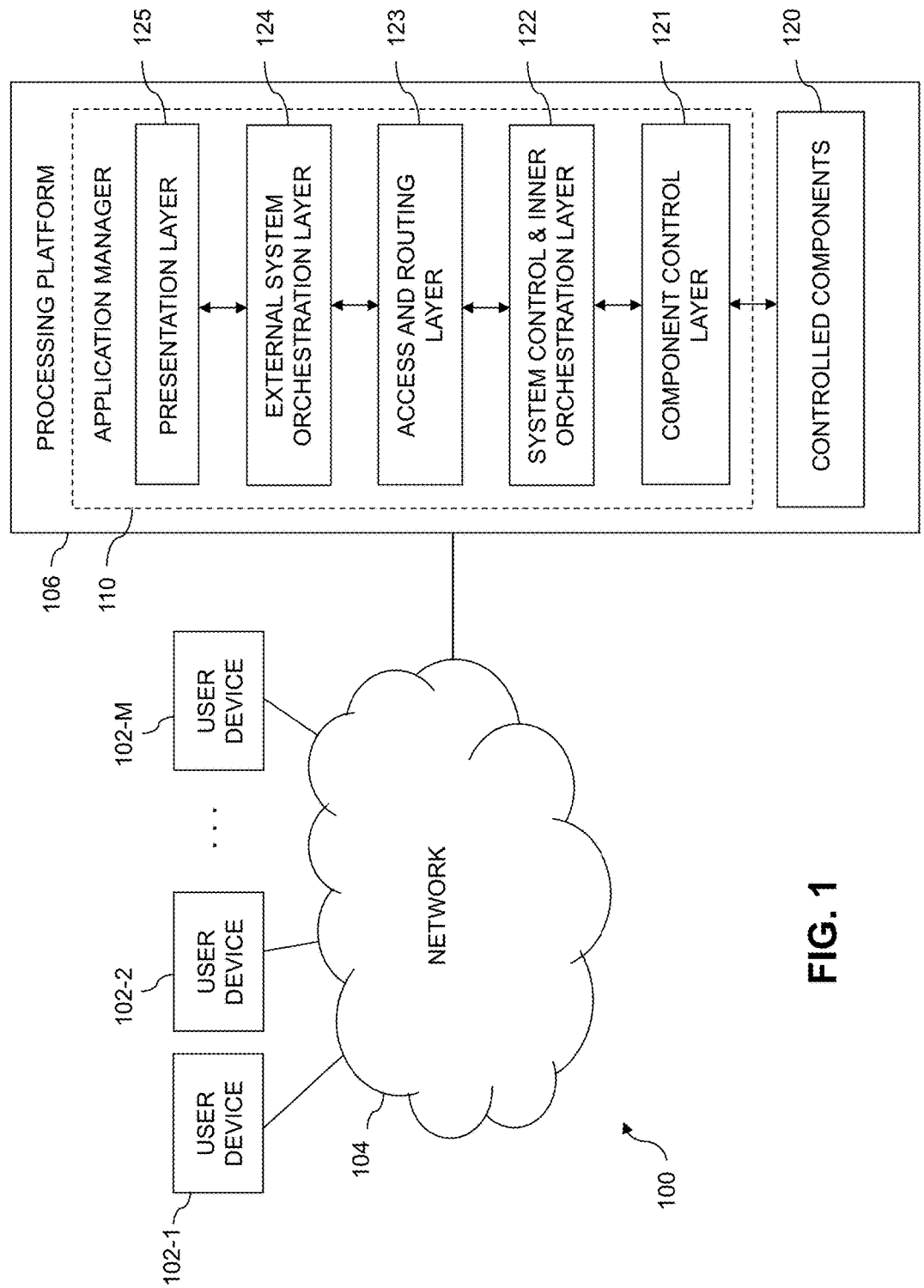
FIG. 1 is a block diagram of an information processing system comprising an application manager configured in accordance with a multi-layer application management architecture in an illustrative embodiment.

FIG. 1 shows an information processing system 100 configured in accordance with an illustrative embodiment of the present invention. The information processing system 100 comprises a plurality of user devices 102-1, 102-2, . . . 102-M coupled via a network 104 to a processing platform 106.

The user devices 102 in this embodiment can comprise, for example, desktop, laptop or tablet computers, mobile telephones, or other types of processing devices capable of communicating with the processing platform 106 over the network 104. Users associated with the respective user devices 102 are assumed to run respective sets of applications utilizing corresponding sets of virtual resources of at least one cloud-based system provided by the processing platform 106. For example, such users may be respective tenants of a cloud data center or other type of multi-tenant environment provided by the processing platform 106. These tenants are examples of what are more generally referred to herein as respective "users" of the processing platform 106. Tenants or other users may also be referred to as "customers" of a cloud service provider.

In some embodiments, the virtual resources comprise a plurality of containers allocable to respective applications under the control of the cloud-based system. Additional or alternative virtual resources that may be used in a given embodiment include virtual machines. For example, the virtual resources may comprise a plurality of virtual machines allocable to the applications under the control of the cloud-based system. Various combinations of containers, virtual machines and other virtual resources may be used in other embodiments. For example, virtual resources may comprise containers running in virtual machines.

The network 104 over which the user devices 102 and the processing platform 106 communicate illustratively comprises one or more networks including, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

The processing platform 106 is assumed to include a plurality of processing devices each having a processor coupled to a memory, and is configured to implement the virtual resources of the cloud-based system for use by applications.

By way of example, the processing platform 106 can be implemented at least in part utilizing converged infrastructure. Such converged infrastructure may comprise at least portions of VxRail™, VxRack™, VxRack™ FLEX, VxBlock™, or Vblock® converged infrastructure from VCE, the Virtual Computing Environment Company, now the Converged Platform and Solutions Division of Dell EMC.

As indicated above, the processing platform 106 in the present embodiment is assumed to implement at least one cloud-based system. Such a cloud-based system is also referred to herein as simply a "cloud."

Examples of different types of clouds that may be utilized in illustrative embodiments include private, public and hybrid clouds. Private clouds illustratively include on-premises clouds and off-premises clouds, where "premises" refers generally to a particular site or other physical location of the business, enterprise, organization or other entity that utilizes the private cloud. Public clouds are assumed to be off-premises clouds. Hybrid clouds comprise combinations of public and private clouds and thus may include various combinations of on-premises and off-premises portions.

The processing platform 106 in the present embodiment is more particularly configured to implement virtual resources of one or more clouds for use by applications of at least one application management domain (AMD). The processing platform 106 further comprises an application manager 110 configured in accordance with a multi-layer application management architecture. The application manager 110 manages controlled components 120 that illustratively include respective ones of the virtual resources and applications. The multi-layer application management architecture of the application manager 110 in this embodiment includes at least a component control layer 121, a system control and inner orchestration layer 122, an access and routing layer 123, an external system orchestration layer 124, and a presentation layer 125, although it is to be appreciated that additional or alternative layers can be used in other embodiments.

The controlled components 120 comprising virtual resources and applications are under control of the component control layer 121. In addition, the applications are managed utilizing interactions between the layers of the multi-layer application management architecture of the application manager 110.

The virtual resources of the controlled components 120 illustratively comprise compute, storage and network resources associated with one or more host devices. Such host devices are examples of what are more generally referred to herein as "processing devices."

Figure 6:
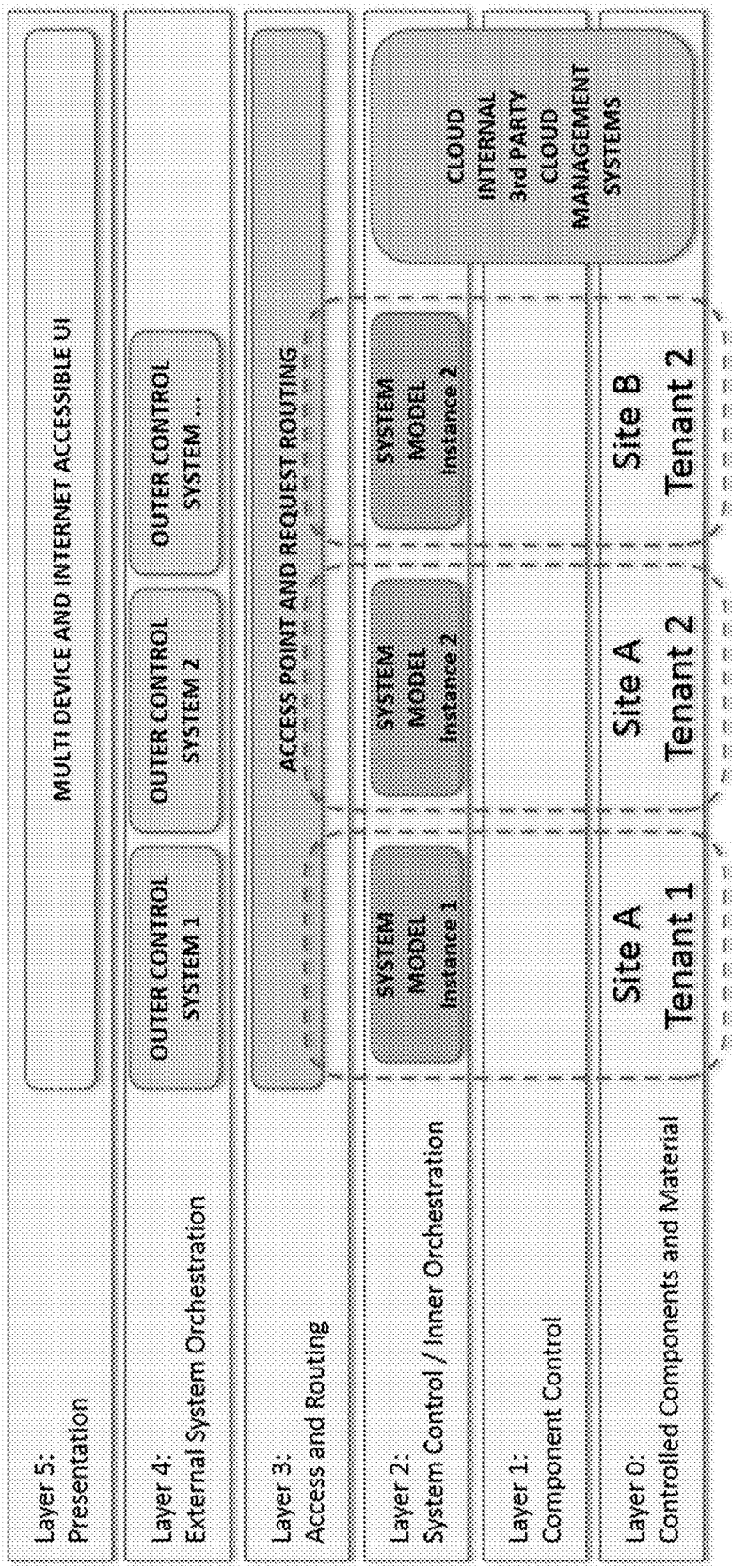
FIG. 6 shows a multi-layer application management architecture in an illustrative embodiment.

An example of the controlled components 120 is shown in FIG. 6 and denoted as Layer 0 associated with a multi-layer application management architecture comprising Layers 1 through 5 that overlay Layer 0.

Although it is assumed in this embodiment that controlled components 120 and hence Layer 0 are not part of the multi-layer application management architecture, in other embodiments it may be considered part of that architecture.

The component control layer 121 illustratively comprises at least one infrastructure controller configured to control the compute, storage and network resources, at least one operating system controller configured to control an operating system of at least one of the host devices, and a plurality of application controllers configured to control respective ones of the applications. An example of the component control layer 121 is Layer 1 of FIG. 6.

The virtual resources may comprise different sets of compute, storage and network resources for different ones of a plurality of clouds and the component control layer 121 may comprise a separate infrastructure controller for each of the different clouds.

In addition, at least a subset of the infrastructure controllers, operating system controllers and application controllers of the component control layer 121 may each be configured to permit execution of actions on its associated controlled components via an application programming interface (API).

The system control and inner orchestration layer 122 illustratively comprises a plurality of system model instances implemented for respective ones of a plurality of tenants of at least one of the clouds. An example of the system control and inner orchestration layer 122 is Layer 2 of FIG. 6.

The system control and inner orchestration layer 122 further comprises at least one inner orchestration engine configured to interact with a plurality of controllers of the component control layer 121 in order to provide services that utilize controlled components 120 of at least one system under control. An example of such an arrangement will be described below in conjunction with FIG. 16. The inner orchestration engine is configured to operate in accordance with a corresponding system model instance. The inner orchestration engine illustratively further comprises or is otherwise associated with a credentials provider configured to store credentials required to access controlled components 120 within a particular AMD of the inner orchestration engine. The system control and inner orchestration layer may comprise a plurality of inner orchestration engines each associated with a different one of a plurality of AMDs.

The access and routing layer 123 illustratively comprises at least one API access point, a request scheduler and a request router. The access and routing layer 123 implements a set of functions for executing operations in the system control and inner orchestration layer 122 on behalf of different tenants associated with different AMDs each having a different inner orchestration engine within the system control and inner orchestration layer 122. An example of the access and routing layer 123 is Layer 3 of FIG. 6.

The external system orchestration layer 124 illustratively comprises at least one outer orchestration engine that executes operations in the system control and inner orchestration layer 122 across multiple tenants via at least one access point of the access and routing layer 123. An example of the external system orchestration layer 124 is Layer 4 of FIG. 6.

The presentation layer 125 illustratively provides one or more user interfaces that are accessible to one or more of the user devices 102 over the network 104. An example of the presentation layer 125 is Layer 5 of FIG. 6.

It is to be appreciated that the particular processing platform configuration illustrated in the FIG. 1 embodiment is presented by way of example only, and that other embodiments can utilize other arrangements of additional or alternative components. For example, the particular layers 121 through 125 of the multi-layer architecture of the application manager 110 can be varied in other embodiments. Accordingly, additional or alternative layers can be used in other embodiments. Also, at least portions of the functionality of a particular one of the layers 121 through 125 can be alternatively implemented in one or more other ones of the layers 121 through 125.

Additional details regarding illustrative embodiments of an application manager suitable for use in conjunction with embodiments disclosed herein can be found in the above-cited U.S. patent application Ser. No. 15/195,159.

As mentioned previously, the virtual resources implemented by the processing platform 106 illustratively comprise containers. Such containers are more particularly assumed to comprise respective Docker containers or other types of Linux containers (LXCs). In embodiments that utilize containers, the processing platform 106 illustratively comprises a plurality of container host devices each implementing one or more of the containers. Each of the container host devices illustratively comprises at least one processor coupled to a memory. Such container host devices are also considered examples of what are more generally referred to herein as "processing devices."

In some embodiments, Docker containers or other types of LXCs may be implemented on one or more Linux processing devices using Linux kernel control groups ("cgroups"). However, it is to be appreciated that embodiments of the present invention are not restricted to use with Docker containers or any other particular type of containers. Accordingly, numerous other techniques can be used in implementing containers in a given embodiment, and such techniques do not necessarily require use of the Linux cgroup feature. Clusters of containers can be managed across multiple container host devices of the processing platform 106 using container cluster managers such as Docker Swarm or Kubernetes. Such cluster managers may be implemented within or in association with the cloud-based system.

The processing platform 106 illustratively incorporates one or more container engines, such as one or more Docker engines. By way of example, a given Docker engine may be preconfigured to run on CoreOS, an open source lightweight operating system based on the Linux kernel and particularly configured to provide functionality for deploying applications in containers. Another example of a lightweight operating system suitable for use in implementing at least portions of the processing platform 106 in some embodiments is VMware® Photon OS™ which has a relatively small footprint and is designed to boot extremely quickly on VMware® platforms.

The processing platform 106 in some embodiments incorporates components for providing certain types of management and orchestration functionality. Such components may include VCE Vision™ Intelligent Operations Software, or other types of management and orchestration components, including components from Pivotal Cloud Foundry, or various combinations of multiple ones of these or other components.

In some embodiments, certain functionality of the cloud-based system is made available to a user by a cloud service provider on a Software-as-a-Service (SaaS) basis. Such users may be associated with respective ones of the user devices 102 and may correspond to respective tenants of the cloud service provider.

However, the term "user" in this context and elsewhere herein is intended to be more broadly construed so as to encompass, for example, human, hardware, software or firmware entities, as well as various combinations of such entities.

It should be understood that the particular arrangements of system and platform components as illustrated in FIG. 1 are presented by way of example only. In other embodiments, only subsets of these system and platform components, or additional or alternative sets of components, may be used, and such components may exhibit alternative functionality and configurations.

Examples of processing platforms that may be used to implement at least portions of the processing platform 106 of the FIG. 1 embodiment will be described in more detail below in conjunction with FIGS. 17 and 18. A given such processing platform comprises at least one processing device comprising a processor coupled to a memory, and the processing device may be implemented at least in part utilizing one or more virtual machines or other virtualization infrastructure.

Additional details regarding illustrative embodiments will now be provided with reference to FIGS. 2 through 16. The embodiments to be described include examples of a multi-layer architecture and associated functionality for an application manager such as application manager 110 of the FIG. 1 embodiment. However, the multi-layer architecture as described more generally provides a reference architecture for implementation of an application management solution (AMS) in a wide variety of different types of cloud-based systems. The reference architecture illustratively comprises Layers 1 through 5 illustrated in FIG. 6. As mentioned previously, the component control layer 121, also denoted Layer 0, is not considered part of the reference architecture in the illustrative embodiments, but could be considered part of that architecture in other embodiments.

The application automation functionality in these embodiments illustratively involves a number of distinct actors. For example, an AMS can enable different organizational units (e.g., intra-company units or multiple company units) to collaborate seamlessly when providing information technology (IT) solutions to end users. In addition to the previously-noted tenants, other actors in a given embodiment may include a cloud service provider (CSP) responsible for cloud infrastructure, and a managed service provider (MSP) that provides application management services in accordance with service level agreements (SLAs) or other types of agreements of service contracts, such as OLAs for tenant internal MSP units. Note that an IT service company may have different organizational units for different services, for example, a unit for customer and/or system onboarding and another for steady-state support of applications.

Different units may have similar roles, as in the case of an "administrator" with different scope depending on the service contracts. If necessary, the actors can be disambiguated by specifying the organizational unit after the role in brackets, for example, as follows:

Administrator (CSP)
Administrator (MSP)
Administrator (Tenant)
IT Business Manager (CSP)
IT Business Manager (MSP)
IT Business Manager (Tenant)

It is to be appreciated that these particular actors and others referred to herein are illustrative examples only, and should not be construed as limiting in any way.

With regard to the systems under control, the AMS may be agnostic. For that reason it may be underpinned by a data and operation model that is not bound to any particular software product family.

In some embodiments, application automation is modeled as changes in parameters and states of software components. All parameters and states form a space in which the application automation and its associated orchestration operates. This space is typically not hard-coded in the AMS, but instead is in the form of a framework for arbitrary parameter and state spaces of Systems under Control (SuCs). The concept is not limited to SuCs but rather applies to SuCs and all controllable components of such SuCs, both also referred to herein as "controllable targets." A particular parameter set and state of a controllable target is referred to as the "configuration" of a controllable target. For example, at a given point of time a database installation is configured with a set of parameters (e.g., data buffer size or enabled logging) and it is in one of the states of the underlying state model.

Figure 2:
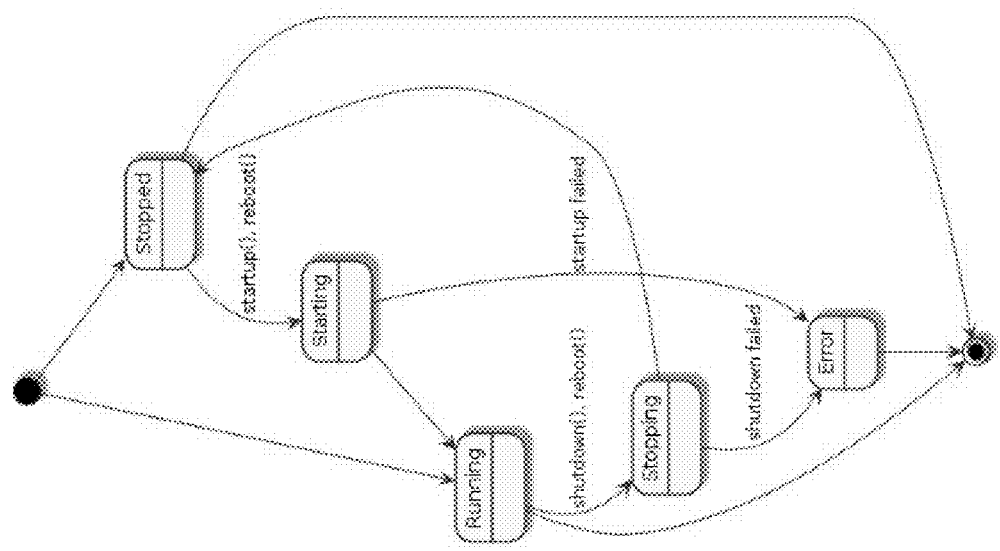
FIG. 2 illustrates an example of a minimum viable model for startup, shutdown and reboot procedures.

FIG. 2 illustrates an example of a minimum viable model for startup, shutdown and reboot (SSR) procedures in one embodiment. The model in this embodiment includes states for Starting, Running, Stopping, Stopped and Error. The AMS may implement additional or alternative SSR-related states and associated transitions to accommodate customer requirements. For example, a system may also transition from the Running or Stopped states into the Error state, but this is not illustrated in the FIG. 2 model as the focus in this illustrative embodiment is on errors during SSR operations.

Figure 3:
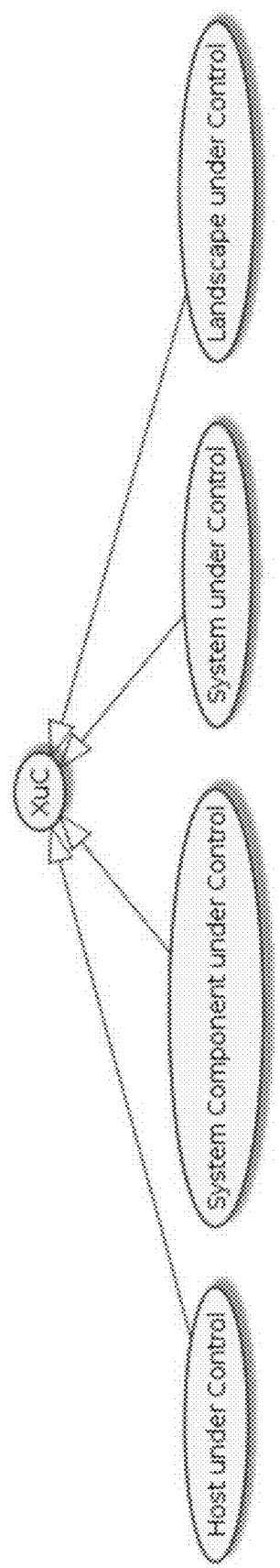
FIG. 3 shows examples of different types of things under control.

FIG. 3 illustrates examples of different types of controllable targets. Controllable targets are not limited to SuCs. More generally, controllable targets can comprise a host, a system component, or a group of systems. The latter is also referred to herein as a "landscape." These and other example controllable targets are also referred to herein as "Things under Control" (XuCs). XuCs are controlled by software components that are referred to herein as "controllers." Such controllers communicate with the XuC via an endpoint that the XuC exposes (e.g., ssh on a UNIX host).

Figure 4:
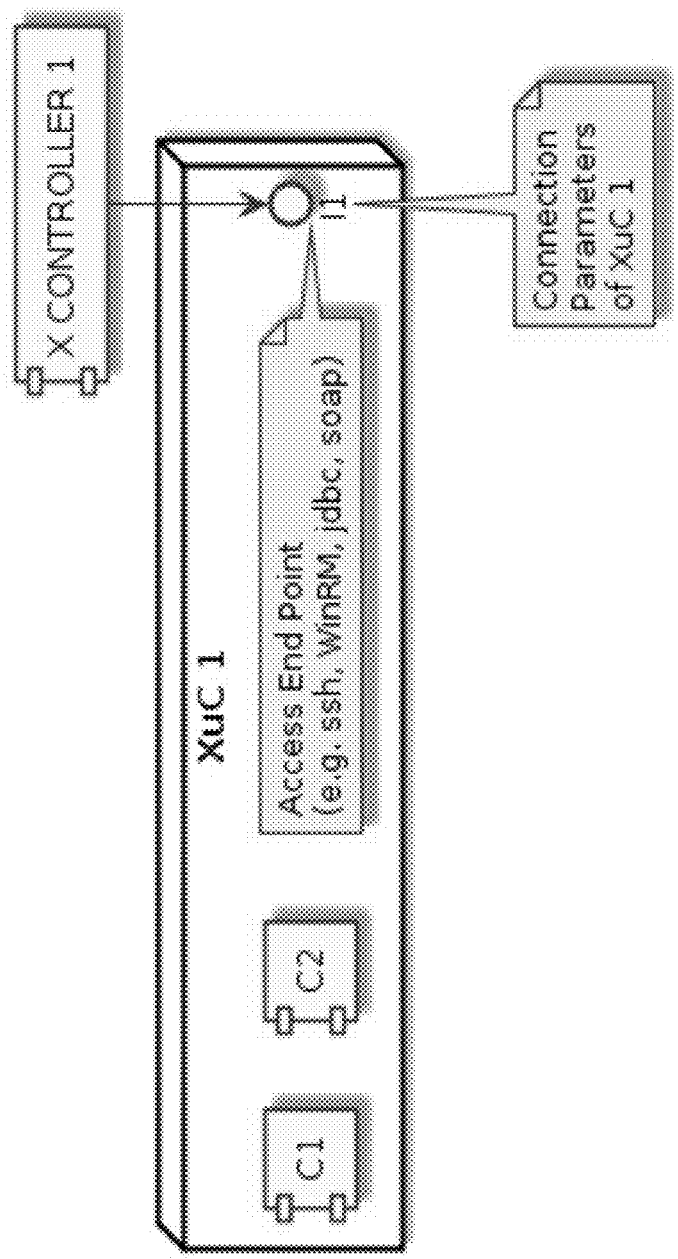
FIG. 4 shows an example of a component controller and a controlled component.

FIG. 4 shows an example of a component controller and a controlled component. The controlled component is denoted XuC 1. In this example, XuC 1 contains elements C1 and C2 that are subject to control. These are not directly accessible, they can only be read and changed via access to the XuC. Such elements are also referred to herein as "controllables" or "indirectly controllable components." Depending on the architecture of the XuC, certain operations may be possible only on such indirectly controllable components.

Operations that query or change the configuration of a target are referred to herein as "atomic operations" (or just "operations") when executed via a controller request. It does not matter how complex the underlying technical process is for one operation (e.g., SAP instance start on a host). The operation is atomic from the point of view of the controller. The execution of the task is either successful or not.

The set of all available atomic operations provided by all controllers that are installed in a particular AMS is referred to as the "inventory of atomic operations." Such operations can be categorized, for example, along stack dimensions (e.g., infrastructure, OS, application) and/or along application management disciplines of monitoring, deployment, configuration and export/import.

The semantics of atomic operations are usually bound to the semantics of the respective controllable targets. There are typical patterns or types of operations that occur repeatedly (e.g., create, copy, delete, start, stop) and instances of such patterns or types of operations often exhibit very similar semantics.

With reference to SSR in the FIG. 2 model, startup and shutdown operations are considered atomic. Whether a controller offers an atomic reboot, however, may depend on the XuC. If not, then the AMS may need to implement a reboot using multiple atomic operations (e.g., shutdown, check state, startup, etc.).

The set of all XuCs that are under control of a given AMS component is referred to as the AMD of that component.

As XuCs can be recursively nested, the resulting systems can be arbitrarily complex.

Figure 5:
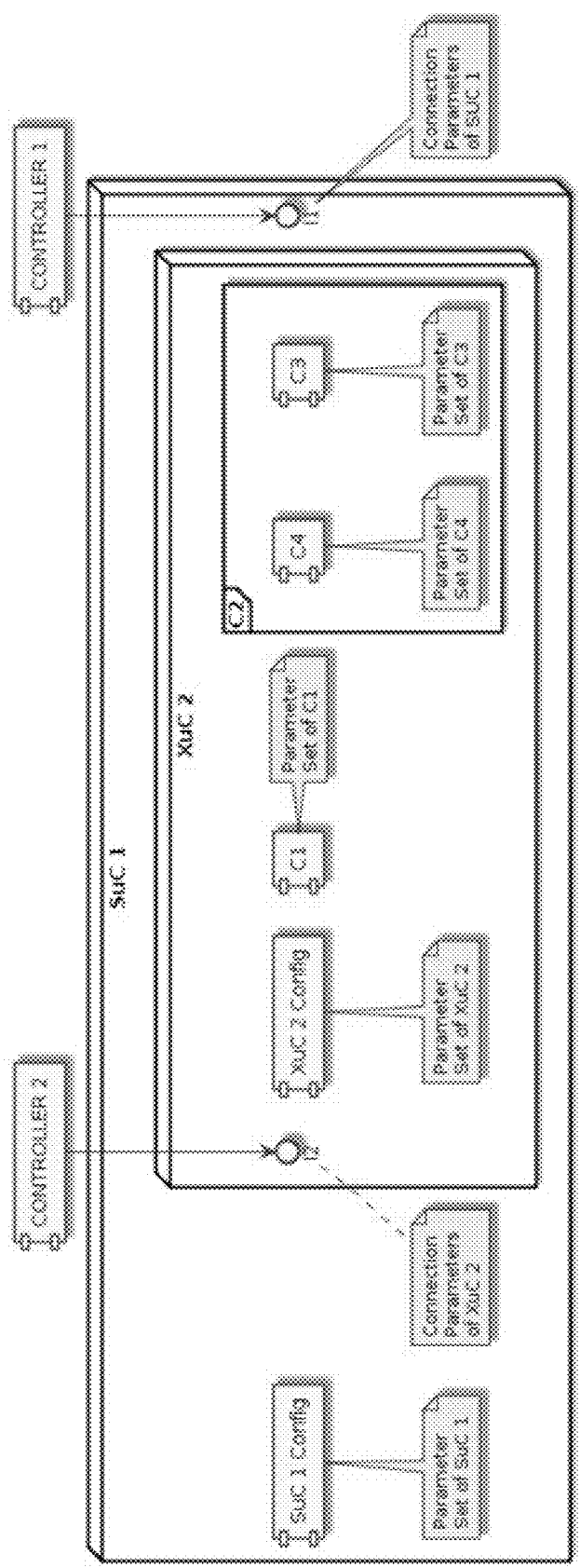
FIG. 5 illustrates controllable targets and configurations in a complex system under control.

FIG. 5 illustrates controllable targets and configurations in a complex system under control or SuC. In this example, an SuC denoted SuC 1 has a child XuC denoted XuC 2. SuC 1 is controlled by a first controller denoted Controller 1 and the embedded XuC is controlled by another controller denoted Controller 2. SuC 1 contains XuC 2. In this example, SuC 1 does not have any other controllables, but XuC 2 has controllables C1, C2, C3 and C4. The controllables C3 and C4 are contained in C2. All targets have parameter sets. In addition, XuC 2 includes connection parameter sets that comprise all required information so that the controllers are able to connect to them.

The set of configurations of an XuC and all contained controllable targets (recursively) combined with the description of the topology of the XuC are referred to herein as the "blueprint" of the XuC. As noted above, configuration of a target subsumes parameter settings as well as the state of the target. The actual or current blueprint of an XuC is referred to as the "factual blueprint" of the XuC. Similarly, the set of blueprints of all XuCs of an AMD is referred to as the "factual blueprint" of the AMD.

The to-be blueprint for an XuC deployment is referred to as the "deployment blueprint." If the factual blueprint of an XuC is used to register an already existing XuC into the AMS then it is referred to as a "registration blueprint." Deployment and registration blueprints are subsumed under "execution blueprints."

Execution blueprints specify all parameters and states required for the execution of the corresponding deployment and/or registration. They may be derived from under-parameterized or otherwise under-specified blueprints that act as templates for the construction of execution blueprints. These under-specified blueprints are called "proto blueprints."

Blueprints complement the use cases in which atomic operations are explicitly executed with use cases that follow a more declarative approach. Upon execution, the AMS converges the XuCs into a configuration that corresponds to the desired state expressed in an execution blueprint provided by the AMS user. In other words, the factual blueprint of an XuC equals the execution blueprint after successful execution.

Deployment blueprints can be used to build up a system or system landscape. For example, a system component can be added to an SuC using an "add child" operation via a deployment blueprint. As another example, a new landscape can be added to an existing landscape using a deployment blueprint.

The multi-layer architecture mentioned previously will now be described in greater detail with reference to FIG. 6. It is assumed that this multi-layer architecture includes five layers denoted Layer 1 through Layer 5. These layers correspond to respective ones of the layers 121, 122, 123, 124 and 125 of the multi-layer architecture of application manager 110 in the FIG. 1 embodiment. There is an additional underlying layer denoted Layer 0 that includes controlled components and material. Such a layer corresponds to the controlled components 120 in the FIG. 1 embodiment. As mentioned previously, in other embodiments, a layer such as Layer 0 can be considered part of the multi-layer architecture.

The multi-layer architecture in illustrative embodiments serves as a reference architecture for an AMS. It is assumed that each of the layers is implemented using redundant servers or other types of redundancy in order to ensure high availability. For example, all controllers of Layer 1 may be implemented on redundant servers for high availability. The other layers may be similarly configured to support high availability.

Layer 0 comprises the controlled components that belong to the managed applications and underlying infrastructure as well as all required material for provisioning of applications. This material may include, for example, software installation media and VM templates.

Layer 1 is the component control layer and comprises infrastructure, OS and application component controllers. For example, different clouds may require different controllers, such as different cloud management platforms (CMPs). Also, different operating systems may require specialized OS controllers and different application components may require specialized application controllers. All controllers in this embodiment are assumed to allow the execution of actions on the controlled component via Representational State Transfer (REST) API, ideally using standardized APIs. This layer provides the first extension point of the AMS by allowing software providers to build controllers that can be plugged into the AMS.

Additionally, Layer 1 is configured to allow the execution of actions on or to query data from existing system components. It is not intended to deploy and/or remove systems or system components or to cater to the complex inherent logic of application systems. The components therein instead adhere to a "fire and forget" strategy. Note that the OS controller is an extension point where server management solutions such as Chef, Salt or Puppet may be hooked in.

Layer 2 is the system control and inner orchestration layer. It is configured to provide services with which operations can be performed on application system level. These services consider the complex nature of a given SuC by properly modeling its state and parameters as well as the states, parameters and dependencies of the components that belong to the SuC. It is also responsible for the provisioning and disposal of systems or system components. If required for core functions such as deploy, launch or shutdown, this layer will orchestrate multiple operations within one Layer 1 controller or across multiple Layer 1 controllers. This type of orchestration, referred to herein as "inner orchestration," is usually not explicitly modelled by an automation engineer but instead implicitly encoded in the system model.

The AMS component that provides the services for Layer 2 is referred to herein as an "inner orchestration engine." The set of all XuCs controlled by that engine is its AMD.

Layer 2 is also the layer in which autonomous application management is implemented. For example, it can provide secure storage of any XuC credentials required to execute operations on the controlled components. The need for securely storing and providing XuC credentials arises in many automation contexts. For example, credentials are typically required in the context of a Puppet manifest.

Layer 2 provides a second extension point in at least two ways. First, the AMS can provide a mechanism to load or install system models supplied by software providers into the corresponding component of the AMS. Second, automation engineers as well as other suppliers can construct and deliver ready-made proto blueprints for software solutions compatible with available system models.

Layer 3 is the access and routing layer. It provides a highly available API access point to the AMS. The API implements a generic, application-agnostic set of functions to execute and schedule operations on Layer 2. It routes requests to the appropriate Layer 2 component of the AMS or to 3rd party cloud management systems that are integrated into the AMS. This support for integration with 3rd party systems can be viewed as providing a third distinct extension point of the AMS.

In addition, Layer 3 implements the multi-tenancy and multi-site requirements of the AMS, including any hybridity requirements. It is also responsible for authentication, authorization and logging of operations. It is assumed that this layer is under governance of the CSP that hosts the AMS.

Layer 4 is the external system orchestration layer. It comprises all components that execute Layer 2 operations through the Layer 3 API in order to perform system management functions. These can be external monitor systems or systems that perform orchestration of multiple operations explicitly modeled by an automation engineer or provided as an additional package by a software provider or other company. Additionally or alternatively, it can include a credentials manager that controls the credentials management component inside Layer 2.

The control systems on Layer 4 are also referred to herein as "outer control systems" as they are outside the API boundaries of Layer 3 and hence need to authenticate against the API.

These control systems can include, for example, workflow systems (e.g., BPMN compatible) or scripting extensions (e.g., plugin into Eclipse for Groovy scripts) that allow automation engineers and others to design, test and run scripts that encode the logic of orchestrated operations. As these systems live outside the tenant and site boundaries they can orchestrate operations on systems across tenants. For example, an MSP administrator may want to apply patches to all SAP systems of all tenants for whom the MSP provides SAP system management services. Or a particular orchestration for one tenant may have to span multiple sites for a hybrid application management scenario.

Layer 4 provides a fourth extension point of the AMS as suppliers can construct and provide automation packages that are compatible with one of the outer control systems of the AMS. Additionally or alternatively, software providers may develop and distribute additional outer control systems that interface with the Layer 3 API.

Layer 5 is the presentation layer of the AMS. It provides a user interface that is directly and easily accessible via the Internet and which works equally well on PC, tablet and even smart phone, depending on the exposed function. For example, some of the actors may need to access the AMS while traveling or during customer meetings, especially users with account manager or IT business roles. This layer constitutes the fifth and final extension point of the AMS as it allows software providers to develop an alternative user interface that interfaces with the outer control systems and the Layer 3 API.

Additional characteristics and other functional features of Layers 1 through 5 in illustrative embodiments will now be described. It is to be appreciated that the particular listings of features provided below and elsewhere herein are not requirements, but are instead possible features of illustrative embodiments. A given embodiment can include only subsets of the listed features, and may include additional or alternative features not explicitly listed.

In the following description, listed features are numbered using the format x.y, where x denotes the layer number, and y denotes the feature number.

The following are examples of functional features of a given controller of Layer 1:

1.1: The controller provides a REST API that allows execution of atomic operations against XuCs. The number and scope of these operations will depend on the particular implementation of the controller.

1.1b: The controller API to execute operations follows a standard to be established by the implementer of the AMS framework.

1.2: The controller provides SDKs (e.g., libraries) for Java and C# for easy integration with Layer 2 engines.

1.3: The controller is stateless.

1.4: The controller can perform the operations on the XuC without the need of having AMS-specific agent software installed on the XuC. Note that agents that belong to the XuC itself does not count as AMS-specific agents. The SAP Control Host Agent that belongs to the SAP NetWeaver stack is such an example.

1.5: The controller does not store credentials for the XuC interface (10).

1.6: The controller can write information into a central logging system for the purpose of root cause analysis of AMS malfunctions.

The following are examples of functional features of a given inner orchestration engine of Layer 2:

2.1: The inner orchestration engine exposes the atomic operations of all controllers that are relevant for the management of the SuC.

2.2: The inner orchestration engine reflects the topology and configuration (e.g., states and/or parameters) of the SuC and the respective configurations of its components.

2.3: The inner orchestration engine caters to the system-inherent dependencies of components when it provides system operations as services via its API. Examples include launch and shutdown operations that should respectively start and stop the system components in the correct order.

2.4: The inner orchestration engine provides services for the deployment of systems and system components via deployment blueprints following standards such as TOSCA and/or OASIS CAMP.

2.5: The inner orchestration engine provides services for the disposal of systems and system components.

2.6: The inner orchestration engine provides services for the registration of existing systems (not deployed by the inner orchestration engine) that are controllable and/or compatible with an installed system model.

2.7: The inner orchestration engine provides services for querying the availability, performance and health of the SuCs and system components.

2.7b: The inner orchestration engine can configure performance and health monitoring components (e.g., thresholds for critical states and/or alerts).

2.8: The inner orchestration engine provides autonomous execution of operations based on configurable rules and/or policies.

2.9: The inner orchestration engine can automatically discover relevant controllables inside the SuC.

2.10: The inner orchestration engine provides interfaces to credentials providers that securely store and present the credentials required for the execution of operations on Layer 0 components.

2.11: The inner orchestration engine provides non-disruptive upgrade of the inner orchestration engine components including the installed system models.

2.12: The inner orchestration engine is configured for high availability.

2.13: The inner orchestration engine can write information into a central logging system for the purpose of root cause analysis of AMS malfunctions.

Whereas components on Layers 0 to 2 belong to one tenant and may be distributed over multiple AMDs, the AMS components on Layer 3 provide one central access point to the AMS that allows execution of system management operations on all AMDs that are part of the AMS installation. This layer allows operations to be executed immediately or scheduled. It makes sure that the request is routed into the appropriate AMD.

The following are examples of functional features of components of Layer 3:

3.1: The access point provides a highly available and scalable REST API through which the user can execute or schedule system management operations against the Layer 2 inner orchestration engine of a connected AMD.

3.1b: The API allows for one time as well as recurrent executions of system management operations.

3.1c: The API logs all executions of system management operations with time and requesting user.

3.2: The access point authenticates the requesting user against an identity management system such as Active Directory or LDAP to which the access point is connected.

3.3: The access point tests whether the authenticated user is authorized to execute and/or schedule the request and declines the request if the authorization is insufficient.

3.4: The request router ensures that requests are routed to the correct Layer 2 inner orchestration engine depending on the targeted AMD specified in the request.

3.5: The AMS securely transports requests into the target AMD even if there is no network connectivity between Layer 3 and Layer 2.

3.6: The access point and/or request router support different Layer 2 inner orchestration engines by implementing a flexible plug-in architecture that specifies how operations can be executed and which authorizations need to be tested for which type of operations.

3.7: The access point and/or request router support the integration with 3rd party system management tools (e.g., in Layer 2, 1, 0) so that it can proxy requests to those tools.

3.8: The AMS contains a Java and/or C# SDK/library for integrating the access point services into Java and/or C# programs.

3.9: The access point and request router write information into a central logging system for the purpose of root cause analysis of AMS malfunctions.

Layer 4 provides additional orchestration capabilities that allow the explicit orchestration of multiple Layer 2 operations via one or multiple orchestration engines. As these components are outside the main Layer 3 access point of the AMS, they are referred to as "outer orchestration engines." Being external allows them to orchestrate operations across multiple tenants and AMDs and to integrate additional AMS-external systems. This provides a high degree of flexibility to MSPs which need to manage systems of many tenants and it constitutes an additional extension point as different 3rd party workflow systems can be leveraged to operate on Layer 4. For example, BPMN workflow engines are designed to model the collaboration between human and system actors.

Layer 4 components do not necessarily have to be workflow engines. The more general term "L4 scripts" is used to denote artifacts that encode the execution logic of the orchestrations. Other more general terms that can be used to describe such components include "recipes," "workflows" or "scripts."

The following are examples of functional features of a given outer orchestration engine of Layer 4:

4.1: The outer orchestration engine can orchestrate Layer 2 system operations by running those operations in sequence, in parallel, with conditions ("gateways"), loops and similar workflow-like control logic ("L4 scripts").

4.2: The outer orchestration engine provides a REST API that allows the execution or scheduling of L4 scripts.

4.3: The outer orchestration engine can propagate the user's credentials to Layer 3.

4.4: The outer orchestration engine can write information into a central logging system for the purpose of root cause analysis of AMS malfunctions.

In some embodiments, the outer orchestration engine may be replaced with an embedded orchestration engine that spans Layer 3 and Layer 4. The AMS in such an embodiment tightly integrates a Layer 4 outer orchestration engine behind the Layer 3 access point.

The user interface (UI) of the AMS is configured to expose all management functions of the AMS in the most usable way. It presents a single point of entry for all AMS actors ("single pane of glass").

The UI may be configured to support, for example, a service catalog for blueprint deployment, authoring of proto Blueprints and L4 scripts, execution of L4 scripts as well as L3 system operations, and graphical representation of the SuC topologies.

The following are examples of additional functional features of a given UI of Layer 5:

5.1: The UI is securely accessible via https.

5.2: The UI can propagate or map user credentials to the Layer 3 and/or Layer 4 access points.

5.3: The UI supports all standard web browsers (e.g., Google Chrome, Microsoft Internet Explorer, Firefox, Apple Safari).

5.4: The UI is suitable for use on a PC as well as mobile devices (e.g., tablets, smart phones).

5.5: The UI is directly accessible via Internet (e.g., no VPN required).

5.6: The UI is securely connected to Layer 4 and Layer 3.

5.7: The UI provides a user role concept so that it will only present to a logged-in user those XuCs, L4 scripts and L3 operations for which the user is assigned the appropriate role.

The above-described features associated with the various layers of the multi-layer application management architecture of FIG. 6 are presented by way of illustrative example only and should not be viewed as limiting in any way.

Some illustrative embodiments disclosed herein provide configurable startup, shutdown, reboot and isolation procedures implemented using application manager 110 comprising the multi-layer application management architecture of FIG. 6. Such procedures are well-suited for use with hybrid multi-tenant clouds and numerous other types of cloud-based information processing systems. These embodiments will now be described in more detail with reference to FIGS. 7 through 16.

In the following description, startup, shutdown and reboot procedures are collectively referred to as SSR procedures. Similarly, startup, shutdown, reboot and isolation procedures are collectively referred to as SSRI procedures.

It should be understood that references herein to SSR can extended in a straightforward manner to SSRI. Also, SSR should be viewed as generally referred to startup, shutdown and/or reboot, and SSRI should be viewed as generally referring to startup, shutdown, reboot and/or isolation.

The AMS in illustrative embodiments is configured to perform SSR procedures for arbitrarily complex applications that can be described by blueprints and have well defined interfaces for startup and shutdown of their single components. The AMS can provide additional functionality to isolate systems for maintenance to protect them from interfering processes stemming from online users, external systems or internal background jobs.

In some embodiments, the AMS is configured to allows an operator to just "push a button" to start up, shut down, reboot or isolate a complex system or even larger groups of systems ("landscapes") relying on appropriate defaults that control the sequences of the SSRI operations along with all required parameters. These defaults can be made configurable in the blueprints of the systems under control. The AMS is also illustratively configured to allow the operator to overwrite these defaults wherever applicable, for example to limit the set of to-be-started systems or system components.

As will be described in more detail below, the AMS in some embodiments is advantageously configured to provide such configurable SSRI functionality utilizing recursive run layers, shutdown modes, isolation levels, pre-SSR and post-SSR actions and a comprehensive SSRI command language that builds on these techniques and includes further options for timeouts, retries and other features. These embodiments provide a highly customizable AMS for startup, shutdown, reboot and isolation of the components of complex enterprise systems and system landscapes.

Illustrative embodiments are able to efficiently address the following example complexities that can arise in implementing SSRI functionality:

1. Software solutions may comprise sets of application systems (called "Landscapes" in the SAP world) with dependencies that the AMS needs to cater to during startup and shutdown.

2. Application systems may comprise multiple components with dependencies that the AMS needs to cater to during startup and shutdown.

3. Application system components may run on different servers.

4. Components of different systems may run on the same server which means that more than one system may be affected when the server is shut down.

5. The service provider sometimes wants to perform a partial startup or shutdown (e.g. only start the RDBMS underlying a SAP system or shut down all system components but keep the servers powered on).

6. Application systems host online users that need to be informed prior to a shutdown as typically defined in the SLAs of service providers.

7. The service provider wants to prevent online users from logging into the applications during the shutdown process or the maintenance window in general. Accordingly, the service provider wants to isolate the system at such times. Systems may become online temporarily during maintenance. The service provider does not want end users to login back to the system in that situation.

8. Application systems run transactions that usually should be safely ("gracefully") completed prior to the shutdown.

9. No new transactions should be started by regular jobs during the maintenance window.

10. The service provider may have to cancel long running transactions in order to keep the maintenance window.

11. The service provider wants to inform other systems such as backup or monitoring systems about the startup and shutdown of systems.

12. The service provider wants to be informed about any application health issues after the startup in order to prevent SLA penalties.

13. The service provider and/or the client wants to automatically execute additional operations prior to the shutdown as well as after the startup.

14. The service provider wants a robust set of startup/shutdown operations with automatic actions during the failure of an involved operation, with proper timeouts, with retries and the option to continue the operation despite errors ("continue on error").

15. The service provider wants to operate a general SSR procedure for all tenants for the sake of efficiency and learnability but at the same time be able to adapt the procedure to cater to tenant and software solution specific requirements.

16. The service provider wants proper audit logs and error logs for the operations.

17. The service provider wants to schedule the SSR operations in advance and manage the resulting tasks within the AMS.

18. The service provider wants the AMS to prevent concurrent SSR operations on the same system or system component.

19. The service provider wants to ensure that only authorized users can perform SSR operations.

It is to be appreciated that the foregoing are examples of particular issues relating to startup, shutdown, reboot and/or isolation that can be addressed in illustrative embodiments by appropriate configuration of application manager 110. Additional or alternative complexities can be addressed in other embodiments. Also, some embodiments address only a subset of the listed complexities and do not address others.

The following description will refer to two example actors:

1. Operator: executes the functions startup, shutdown, reboot and isolate on system landscapes, systems, system components/instances or VMs.

2. Administrator: configures the AMS to adapt the general SSR procedure to customer requirements.

Examples of SSR features of illustrative embodiments and associated actors and functional details are shown in the table below.

| Feature | Actor(s) | Functional Details |
| --- | --- | --- |
| SSR Operations | Operator | SSR operations with equal semantics/parameters for: Operating Systems/VMs/physical servers System Components aka "Instances" or "Services" Systems System Landscapes |
| System Isolation | Operator | Apply a defined ISOLATION LEVEL to a system |
| Configure SSR Parameters per Blueprint | Administrator | The blueprint describes the topology and parameters of systems and system landscapes; The AMS provides SSR relevant configuration parameters for the related blueprint sections. These parameters constitute the defaults of the general SSR procedure |
| Specify SSR Pre- and Post Actions | Administrator | The Administrator is able to hook in actions into the SSR procedure at all layers of the system topology, e.g. actions that need to be executed prior to the shutdown of a particular system component |

With regard to shutdown modes, the AMS is configured in illustrative embodiments to follow a shutdown approach that is harmonized across all layers of the application stack. Harmonization involves using the same terminology for all XuCs and controlled components while each vendor of the XuCs comes with its own terminology. The shutdown approach will follow vendor recommendations but the AMS attempts to fit such recommendations into the generalized SSR procedure for the sake of usability, understandability and learnability. By way of example, different XuCs may behave differently with regard to the following abilities:

1. Built-in notification of users, configurable shutdown countdown period.

2. Various shutdown options ("modes"), including graceful shutdown, immediate shutdown or ungracious shutdown, although vendors use different terms. "Graceful" generally means that online users have time to log off, open transactions can be completed and jobs can finish. "Immediate" generally means that the XuC still does a proper, controlled shutdown but it will not wait for users to log off or transactions/jobs to finish. "Ungracious" generally means a brutal, immediate stop that can be compared to pull the power plug of the machine.

3. Timeouts for the execution of shutdown (and whether these are built-in or can be parameterized). Often there are timeouts to escalate from one shutdown mode to the next (e.g., graceful to immediate). Such timeouts are also referred to herein as "escalation timeouts."

4. Ability to cancel the shutdown either manually or after a configurable execution timeout.

The table below illustrates some of the possible differences between different components of the application stack with regard to these capabilities.

Illustrative embodiments utilize recursive run layers in implementing SSR or SSRI functionality, as will now be described in more detail.

The sequence of the startup and shutdown procedures (and with that the sequence of restart) can be modelled in blueprints by declaring dependencies between systems and system components, respectively. However, often the startup sequence does not depend on single systems, but rather groups of systems. For example, a sequence may require that Systems D, E and F are started only after systems A, B and C are up and running. Therefore systems are assigned to run layers which determine the SSR sequence. The run layers in some embodiments are denoted by respective integers, although other representations of run layers can be used.

Run layers that declare the SSR sequence of systems within landscapes are referred to as Landscape Run Layers and run layers that specify the SSR sequence of system components within systems are referred to as System Run Layers. Run layers are of a recursive nature which means that run layers within components as well as for groups larger than landscapes are possible.

The recursion functionality may be expressed as follows: Let G be a group of XuCs where each XuC is assigned to exactly one Run Layer of G. The startup (shutdown) sequence of XuCs follows in the ascending (descending) order of Run Layers of G by recursively executing the startup (shutdown) procedure for each XuC in Run Layer N before executing the startup (shutdown) procedures for the XuCs in Run Layer N+1 (N−1).

| Component (Layer 0) | User Notification | Graceful Shutdown | Immediate Shutdown | Ungracious Shutdown |
|---|---|---|---|---|
| SAP NetWeaver System | No user notification prior to the shutdown, only information that a soft shutdown is in progress when user logs in | "Soft shutdown" with soft timeout; shutdown cannot be cancelled | "Hard shutdown"; shutdown cannot be cancelled | Not available |
| ORACLE RDBMS | None | SQL shutdown | SQL shutdown immediate | SQL shutdown abort |
| MSSQL RDBMS | None | SQL shutdown | SQL shutdown WITH NOWAIT | Not available |
| Windows Server | CMD: shutdown/T = TIME Users will be notified; TIME is shutdown countdown period; shutdown can be cancelled during that time | Sends termination signal to applications/ services; built in soft escalation timeout of 20-30 sec depending on Windows version*; shutdown cannot be cancelled | immediate shutdown enforced by/f flag | Power off |
| Linux Server | CMD shutdown TIME Users will be notified; TIME is shutdown countdown period; shutdown can be cancelled during that time | Uses init scripts for save shutdown; Shutdown can be cancelled; within the last five minutes of TIME, new logins are prevented. | shutdown - now (note this still uses the init system as opposed to halt -f) | Power off |

Figure 7:
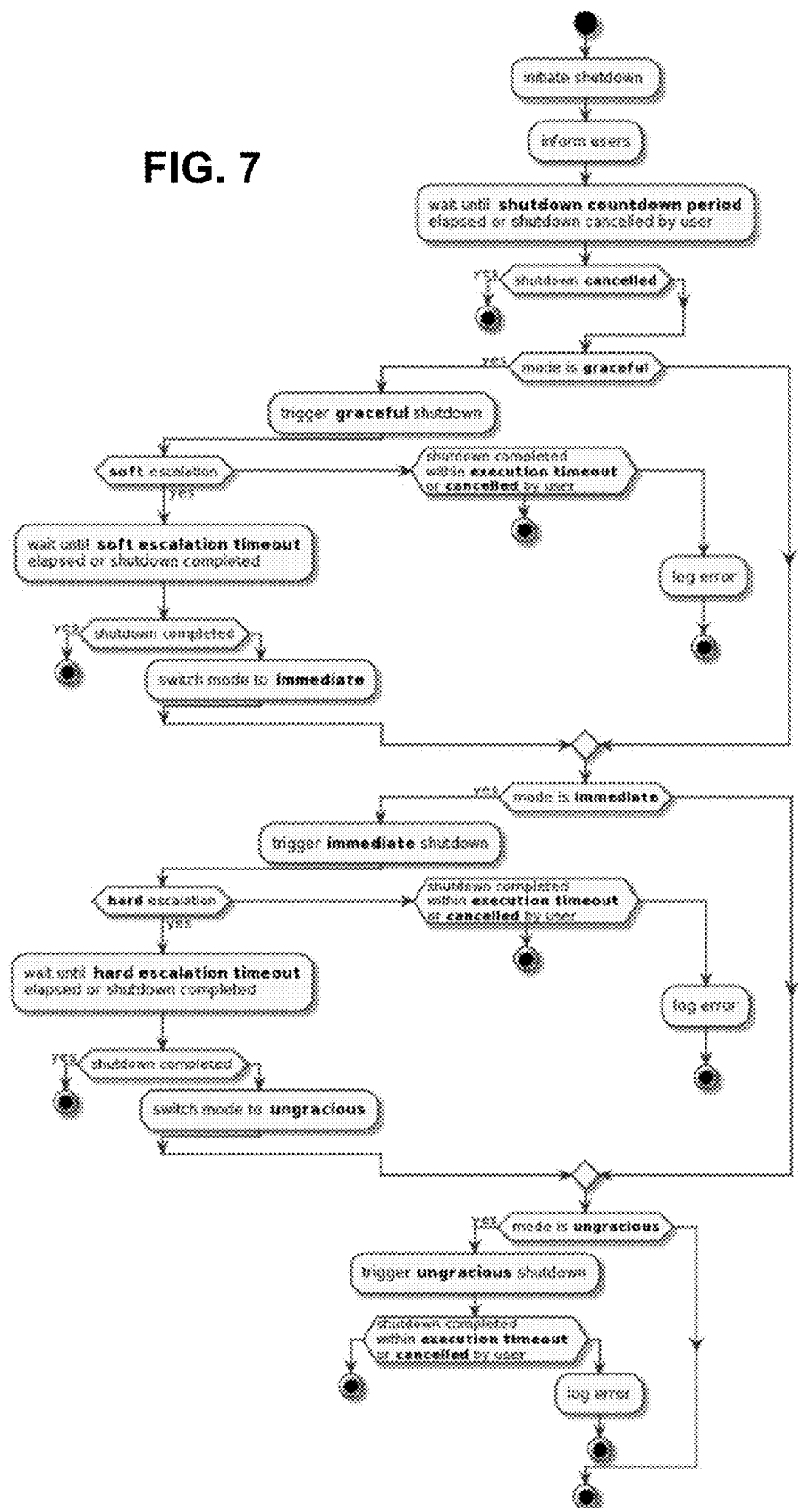
FIG. 7 is a flow diagram of a generalized shutdown procedure in an illustrative embodiment.

A generalized shutdown procedure providing implementations of graceful, immediate and ungracious shutdown and associated timeouts using the above-described shutdown modes is illustrated in the flow diagram of FIG. 7. It is to be appreciated that numerous other shutdown procedures can be used in other embodiments.

Figure 8:
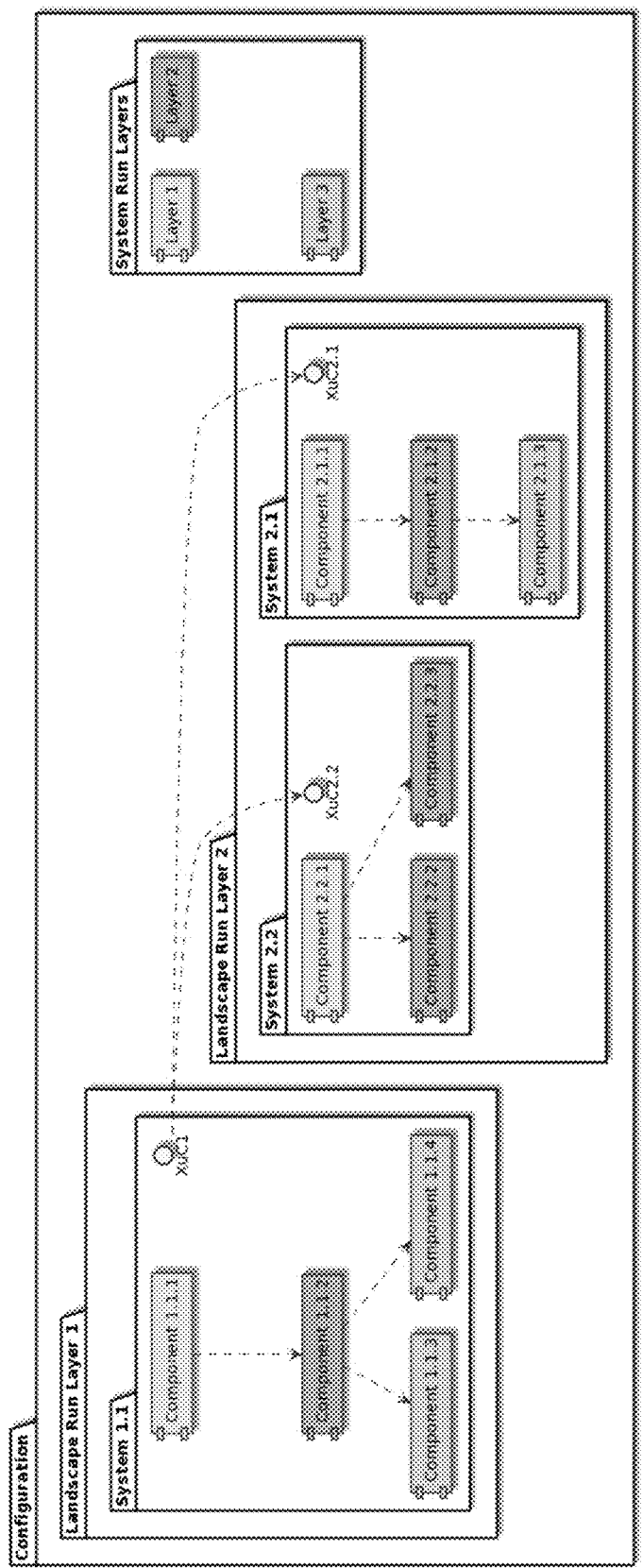
FIG. 8 illustrates an example configuration for recursive run layers.

FIG. 8 illustrates an example configuration illustrating recursive run layers. As per the Landscape Run Layer assignments the depicted configuration prescribes the startup of system 1.1 before the startup of systems 2.1 and 2.2 (the dashed lines indicate the sequence). There is no specific sequence regarding systems 2.1 and 2.2 which means they may be started in parallel (e.g., for efficiency reasons). The System Run Layer assignments in this configuration require that when system 1.1 is started then its components need to be started in the sequence 1.1.1, 1.1.2, then 1.1.3/1.1.4 (these two can be started in parallel). A similar sequence is prescribed for the components of the other systems.

For operators it may be easier to memorize meaningful tags for run layers rather than the run layer numbers. Accordingly, some embodiments utilize an XuC configuration that allows run layers to be tagged. Typical tags could include "DB" (for databases) and "AI" for application instances, although many others could be used.

Additional tags may be implicitly available by convention, such as a logical tag NONE to represent the layer below the lowest run layer in the configuration, and a logical tag MAX to represent the highest layer in the configuration.

Run layers allow a compact representation of a startup command that (recursively) limits the set of systems (and components) that are to be started. Using run layers the operator can specify that all systems (or components) up to a specified run layer are to be started. That specified run layer is referred to as the Target Layer of the startup process. The tag MAX is the default for the startup target layer. Further, the startup process can automatically startup any machines/operating systems (VM, physical machine) required by any of the XuCs. In addition, the operator should have the option to exclude specific systems (components) from the startup by specifying a blacklist of systems (components).

This target layer functionality may be expressed as follows: Let G be a group of XuCs where each XuC is assigned to exactly one Run Layer of G. Starting group G up to the Target Layer N with a blacklist B means starting all XuCs (including machines) that are assigned to run layers 0 to N except those XuCs that are listed in B.

With reference again to the example configuration of FIG. 8, the operator is able to specify the startup of the systems 1.1 and 2.2 in the landscape L by declaring:

STARTUP LANDSCAPE L TARGET 2 EXCEPT SYSTEM 2.1

Other equivalent versions include each of the following:
STARTUP LANDSCAPE L TARGET MAX EXCEPT SYSTEM 2.1
STARTUP LANDSCAPE L EXCEPT SYSTEM 2.1

Note that implicitly the tag MAX is assumed as the default target within systems which means that all components in all to-be-started systems will be started.

The use of recursive run layers allows the operator to limit the set of components to be started as well. A suitable notation uses dashes to append target run layers for recursion. The following examples provide an illustration (curly braces indicate parallel actions and arrows indicate sequences):

| Command | Meaning | Components to be started |
| --- | --- | --- |
| STARTUP SYSTEM 2.1 TARGET 2 | Startup system 2.1 up to system run layer 2 | 2.1.1 → 2.1.2 |
| STARTUP LANDSCAPE L TARGET 1-2 | Startup all systems in landscape run layer 1, but only components of system run layer 1 and 2 | 1.1.1 → 1.1.2 |
| STARTUP LANDSCAPE L TARGET MAX-1 | Startup all systems in the landscape ("MAX"), but only components of system run layer 1 | 1.1.1 → {2.1.1, 2.2.1} |
| STARTUP LANDSCAPE L TARGET MAX-2 | Startup all systems in the landscape ("MAX"), but only components of system run layer 1 and 2 | 1.1.1 → 1.1.2 → {2.1.1 → 2.1.2}, {2.2.1 → 2.2.2 → 2.2.3} |

In a similar manner, the shutdown can be (recursively) limited by specifying the set of systems (and components) that will not be stopped but rather "retained." As the operator wants to specify whether the machines/operating systems are to be kept running or not, the tags OS and NOOS are used, with the tag OS indicating that no operating system/machine will be shut down (this should be the default), and the tag NODS indicating that each operating system/machine will be shut down if in the course of the shutdown process no component is running on it any more. A given machine is said to be "released" if there is no further (controlled) application process running on it.

This functionality can be expressed as follows: Let G be a group of XuCs where each XuC is assigned to exactly one Run Layer of G. Shutting down group G retaining Layer N-OS with a blacklist B means stopping all XuCs that are assigned to run layers MAX down to N except those XuCs that are listed in B. No machines will be shut down. If the retained layer is N-NOOS then in addition all machines/operating systems will be shut down once they are "released."

The following examples illustrate the specification of shutdown processes:

| Command | Meaning | Components to be shut down |
| --- | --- | --- |
| SHUTDOWN SYSTEM 2.1 RETAIN 1-NOOS | Shut down system 2.1 including all released machines ("NOOS") but keep the component on system run layer 1 running. | 2.1.3 → 2.1.2 |
| SHUTDOWN LANDSCAPE L RETAIN NONE-1-OS | Shut down all systems in the landscape, but keep components of system run layer 1 running. Also keep the operating systems running. | {2.2.3 → 2.2.2}, {2.1.3 → 2.1.2} → {{1.1.4, 1.1.3} → 1.1.2} |
| SHUTDOWN LANDSCAPE L RETAIN 1-NONE-NOOS | Shut down all systems assigned to layer 2 (retain 1) and shut down all components in those systems that are to be stopped. Also shut down all released machines. | {2.1.3 → 2.1.2 → 2.1.1} {2.2.3 → 2.2.2 → 2.2.1} |

The reboot of landscapes, systems and components can utilize a combination of techniques including shut down retaining a specified layer, then starting up to a specified target layer, as illustrated in the following table:

| Command | Meaning | Components to be shut down /started |
|---|---|---|
| REBOOT SYSTEM 2.1 | Shut down all components of system 2.1 (retaining "NONE" as the default), then start all system components (target is MAX as default). Do not reboot machines (default). | Shut down:<br>2.1.3 → 2.1.2 → 2.1.1<br>Start:<br>2.1.1 → 2.1.2 → 2.1.3 |
| REBOOT SYSTEM 2.1 RETAIN NONE-NOOS | Shut down all components of system 2.1, including released machines ("NOOS"), then start all system components (target is MAX as default) | Shut down:<br>2.1.3 → 2.1.2 → 2.1.1<br>Start:<br>2.1.1 → 2.1.2 → 2.1.3 |
| REBOOT SYSTEM 2.1 RETAIN NONE-OS TARGET 2 | Shut down all components of system 2.1, but not the operating systems, then start the system components up to system layer 2. | Shut down:<br>2.1.3 → 2.1.2 → 2.1.1<br>Start:<br>2.1.1 → 2.1.2 |
| REBOOT LANDSCAPE L RETAIN NONE-1-OS TARGET MAX-2 | Shut down all systems in the landscape, but keep components of system run layer 1 running as well as the machines. Afterwards start all systems ("MAX") up to system run layer 2. | Shut down:<br>{2.2.3 → 2.2.2},<br>{2.1.3 → 2.1.2} →<br>{{1.1.4, 1.1.3}→<br>1.1.2}<br>Start:<br>1.1.2 → {2.1.2,<br>{2.2.2 → 2.2.3}} |

Run layer tags address two issues with regard to recursive targets. The first issue is that the operator would otherwise have to memorize run layer numbers for a lot of different XuCs. Recursive targets make this even more difficult. In this context, tags are very helpful, especially if they follow a naming convention established by the service provider in charge of a particular AMD.

The second issue arises when the target of an SSR operation includes multiple XuCs that are heterogeneous with respect to their run layer configuration. For example, assume a landscape L with two systems. Let the database of system 1 be assigned to run layer 1 and (for whatever reason) the database of system 2 be assigned to run layer 2. In this case there is no straightforward recursive target to express the desire to only start the databases of both systems.

However, if tags are used, following an established naming convention, then both databases could be assigned to the same tag, such as RDBMS. The following command would then lead to the desired outcome:

STARTUP LANDSCAPE L TARGET MAX-RDBMS

Additional details relating to isolation procedures in illustrative embodiments will now be described. Often during maintenance an operator will shut down a system to prevent access through online users and external systems or to ensure that no background processes are running in that system. The goal is to isolate (e.g., segregate) that system from other systems and users during maintenance. However, a shutdown is typically not the only way to isolate a system and often not the preferred one, for example, because during shutdown the system may lose its cache (and hence is less responsive after startup) or because the system may need to be available for online access for operators and other administrative users during maintenance. Alternative approaches for isolation include firewalling, temporarily locking user accounts and the like. Linux operating systems, for example, can be "isolated" by switching into run level 1 or 2.

Isolation of systems is related to SSR. For example, an operator may want to reboot a system (or system component) into a certain isolated state. Further, isolation is of a recursive nature as it is with SSR. A landscape is isolated by isolating its systems.

Isolation in illustrative embodiments can be described as a vector of Boolean states into which the XuC may be put. For example, the following extensible set of states may be used in some embodiments:

1. Network-accessible: TRUE if the XuC can be reached via a network, else FALSE
2. User-accessible: TRUE if online users are able to log into the XuC, else FALSE
3. System-accessible: TRUE if external components are able to log into the XuC, else FALSE
4. Has-logins: TRUE if users are logged in, else FALSE
5. Runs-jobs: TRUE if back ground jobs (or tasks) are allowed to run, else FALSE For each state the AMS can offer blacklists of networks/user/systems/jobs/etc. that are exempt from the isolation.

In general, the more restrictions (the more TRUEs in the vector), the higher the isolation level of the XuC.

Note that the reverse operation of isolation is referred to herein as "desegregation," and is denoted by isolation level 0.

Depending on the requirements and IT maintenance policies of a customer, different combinations of isolation states may be involved. This can be customized by configuring isolation levels, as in the following example:

| Isolation State | Isolation Level |
|---|---|
| Runs-jobs = FALSE | 1-4 |
| Has-logins = FALSE | 2-4 |
| User-accessible = FALSE | 2-4 |
| System-accessible = FALSE | 3-4 |
| Network-accessible = FALSE | 4 |

This definition facilitates the implementation of concise commands for system isolation. Some examples include the following:

1. Disable jobs in system S:
ISOLATE SYSTEM S LEVEL 1
2. Logoff users and prevent new logins from users and systems:
ISOLATE SYSTEM S LEVEL 3
3. Similar to item 2 above but exclude users X and Y and system Z:

ISOLATE SYSTEM S LEVEL 3 EXCEPT USER X, USER Y, SYSTEM Z

The above-described isolation approach is even more advantageous when it leverages the run layers using the RETAIN statement (similar to the shutdown), which can be expressed as follows: Let G be a group of XuCs where each XuC is assigned to exactly one run layer of G. Isolating group G to Level L retaining Layer N with a blacklist B means applying isolation level L to all XuCs that are assigned to run layers N+1 to MAX except those XuCs that are listed in B. B may include references to additional objects that are exempt from the isolation (such as specific users).

With reference once again to the example configuration of FIG. 8, the isolation of the entire landscape to level 3 may be expressed as:

ISOLATE LANDSCAPE L LEVEL 3.

Note that retained layer NONE is implicitly the default. To just isolate the systems in landscape run layer 2, the following command is used:

ISOLATE LANDSCAPE L LEVEL 3 RETAIN 1.

More complex implementations may also provide functions for recursive isolation.

Some embodiments are configured to include pre-, post- and exception actions for startup and shutdown, as will now be described in more detail. In many cases the operator wants the AMS to automatically perform additional actions on systems prior and/or after the startup or shutdown of a system or system component. Typical examples of such actions include the proper shutdown of interfaces or the notification of users in the system (if this is not taken care of by the system's native shutdown operation).

Therefore the AMS in some embodiments provides the option to incorporate pre- and post actions at various stages of the entire SSR process as well as actions for handling exceptions. These actions may depend on factors such as the AMD, the SSRI command and its input parameters, and characteristics of (recursively) targeted XuCs (e.g., ID, configuration, current state, result of the SSRI action (especially to trigger exception handling)).

As mentioned previously, illustrative embodiments implement a command language for SSR and/or SSRI. This language can be used for a CLI that the operator can use to start up, shut down, reboot and/or isolate the various XuCs. It can also be seen as an example of the formal specification of the input that any API on AMS Layer 2 has to support.

Examples of command grammars associated with an SSRI command language are illustrated in FIGS. 9 through 14.

Figure 9:
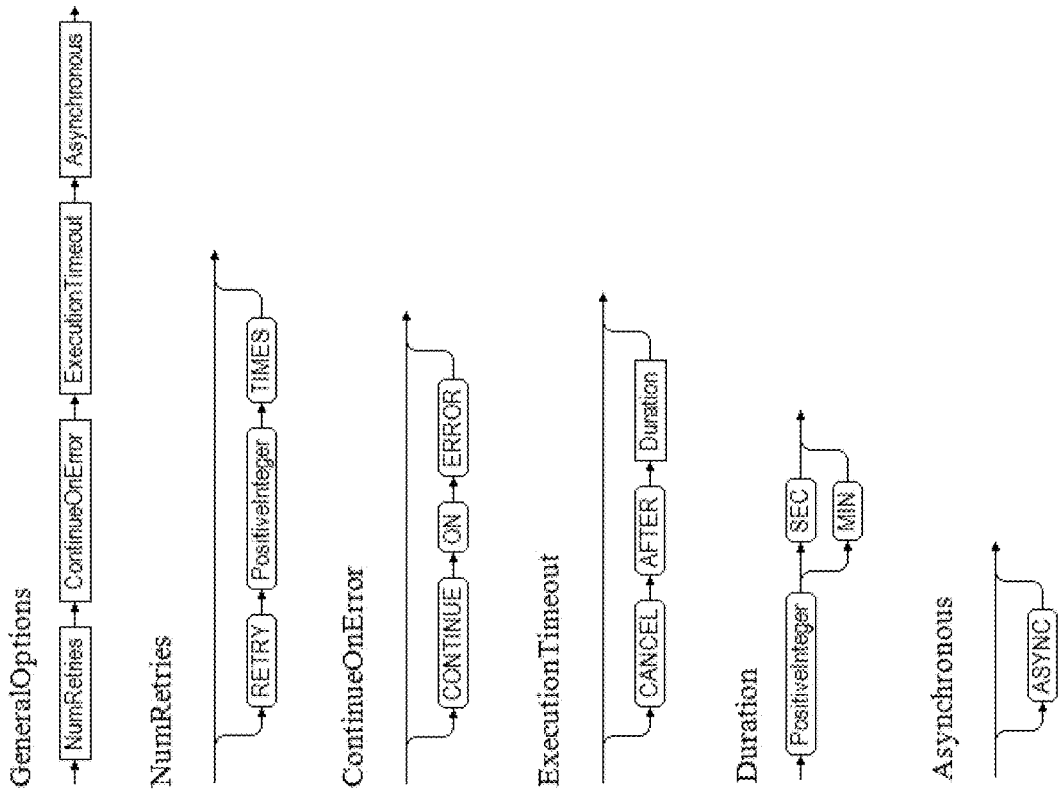
FIGS. 9 through 14 show exemplary command grammars of a command language for startup, shutdown, reboot and isolation procedures in illustrative embodiments.

The SSRI command language illustratively includes the general options shown in FIG. 9 and summarized in the table below. Certain non-terminal fields of these general options such as "PositiveInteger" are not explicitly defined but left to the implementation.

| OPTION | Meaning |
|---|---|
| RETRY | specifies how often the AMS should attempt to execute the desired SSRI task |
| CONTINUE ON ERROR | specifies whether the SSRI task should continue if any of the XuCs fails to be started/shut down/rebooted/isolated during recursive execution |
| EXECUTION TIMEOUT | specifies the time after which the controller will cancel the execution of SSRI; after the cancellation another attempt will be made if specified by the RETRY option |
| ASYNC | when provided the SSRI operation will happen in the background |

All options other than the ASYNC option can be passed down recursively to smaller XuCs. It should also be noted that not all options are always be supportable during SSRI of an XuC depending on the capabilities of the XuC controller. In such cases, the AMS may issue a warning in the respective log file.

Figure 10:
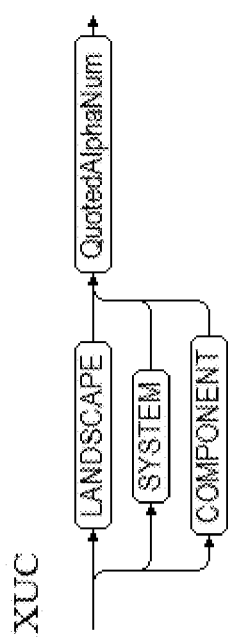

FIG. 10 illustrates a target XuC command grammar. The target XuC is specified after a top-level SSRI command. The target XuC command in this embodiment is assumed to be in an AMS implementation that supports the hierarchy Landscape>System>Component. QuotedAlphaNum is a quoted alphanumeric string. This part of the language may be changed and/or extended as required.

Figure 11:
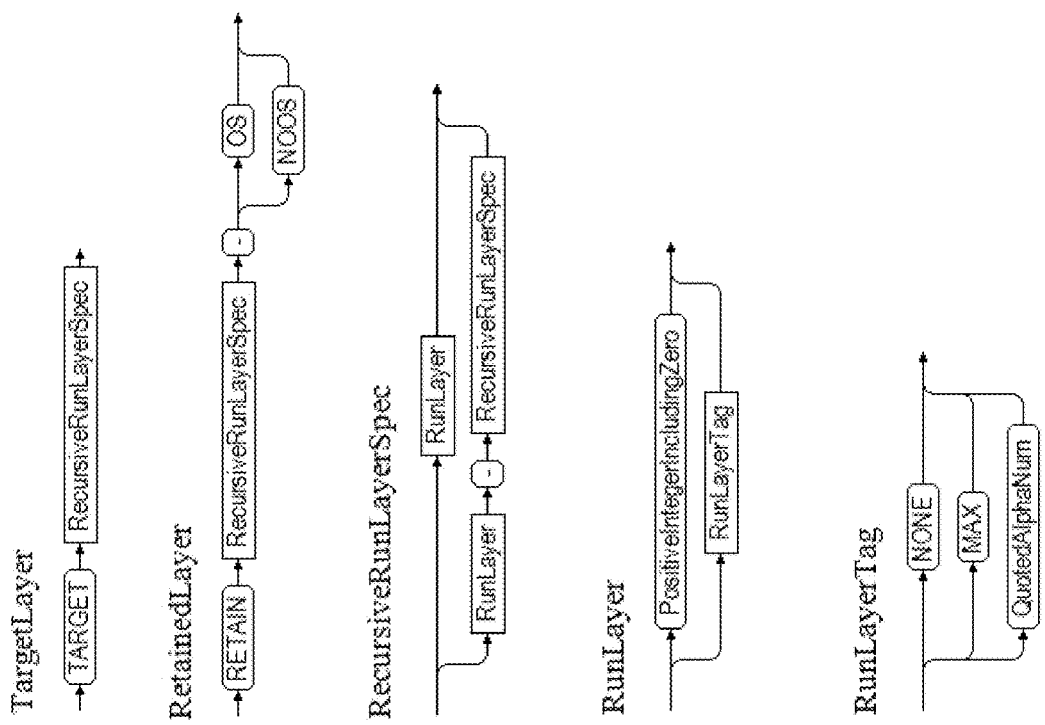

FIG. 11 illustrates target layer and retained layer command grammars. After the specification of the XuC the target layer or retained layer is provided. The AMS is configured to interpret the recursive run layer specification and map it to the relevant layers configured for the target XuC.

Figure 12:
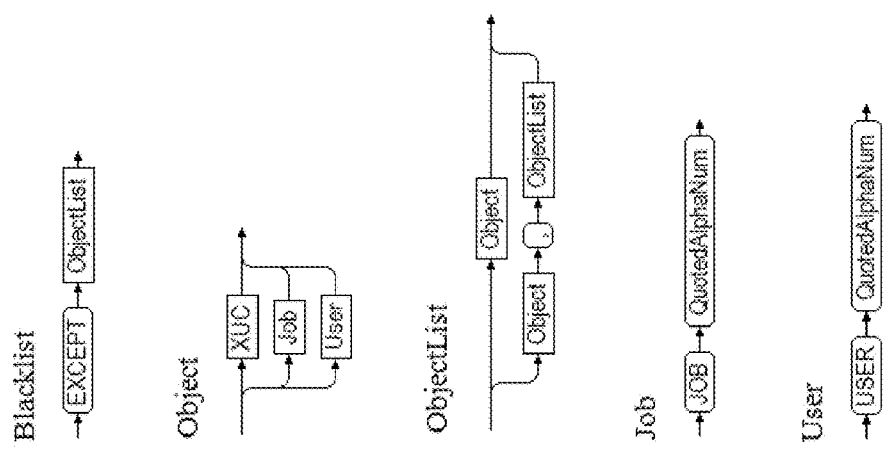

FIG. 12 illustrates a blacklist command grammar. Blacklists include XuCs and additional objects that should be exempt from the SSRI execution, specified using the blacklist command grammar. An AMS implementation may adapt and/or enhance this grammar in order to accommodate additional object types.

Figure 13:
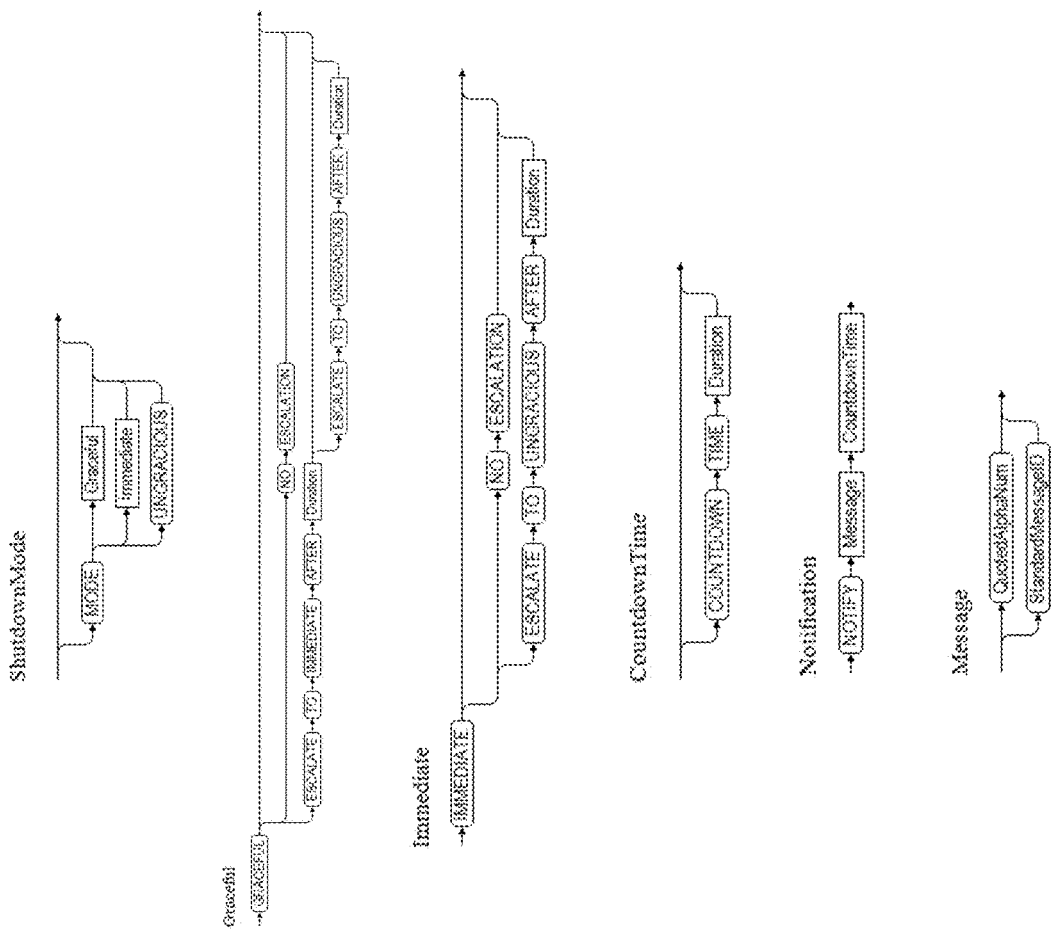

FIG. 13 illustrates a shutdown command grammar. Various aspects of this example grammar including options and possible defaults are further explained in the table below. An AMS implementation may permit an operator to configure the defaults on a per XuC type basis. Note that not all XuC controllers will support all options. If an XuC controller does not support a particular option, it should issue a warning during escalation and fall back to the nearest available option. For example, an XuC controller in some embodiments may not provide the option of an ungracious shutdown.

| OPTION | Meaning | Proposed Default |
|---|---|---|
| MODE | see With regard to shutdown modes elsewhere herein | GRACEFUL |
| ESCALATE | specifies the maximum degree of escalation: NO ESCALATION TO IMMEDIATE: escalate to IMMEDIATE after the escalation timeout has passed TO UNGRACIOUS: escalate first to IMMEDIATE after the escalation timeout has passed (in the case of GRACEFUL), then | Mode = Graceful: UP TO IMMEDIATE (with timeout 5 Min) Mode = Immediate: NO ESCALATION |

-continued

| OPTION | Meaning | Proposed Default |
|---|---|---|
| | escalate to UNGRACIOUS after the related timeout has passed | |
| NOTIFY | used to notify users of the XuC using a quoted text or the ID of a standard message (we leave the details to the AMS implementation) | |
| COUNTDOWN TIME | time between user notification and triggering of shutdown operation (the default should be configurable in the AMS) | 5 min |

Figure 14:
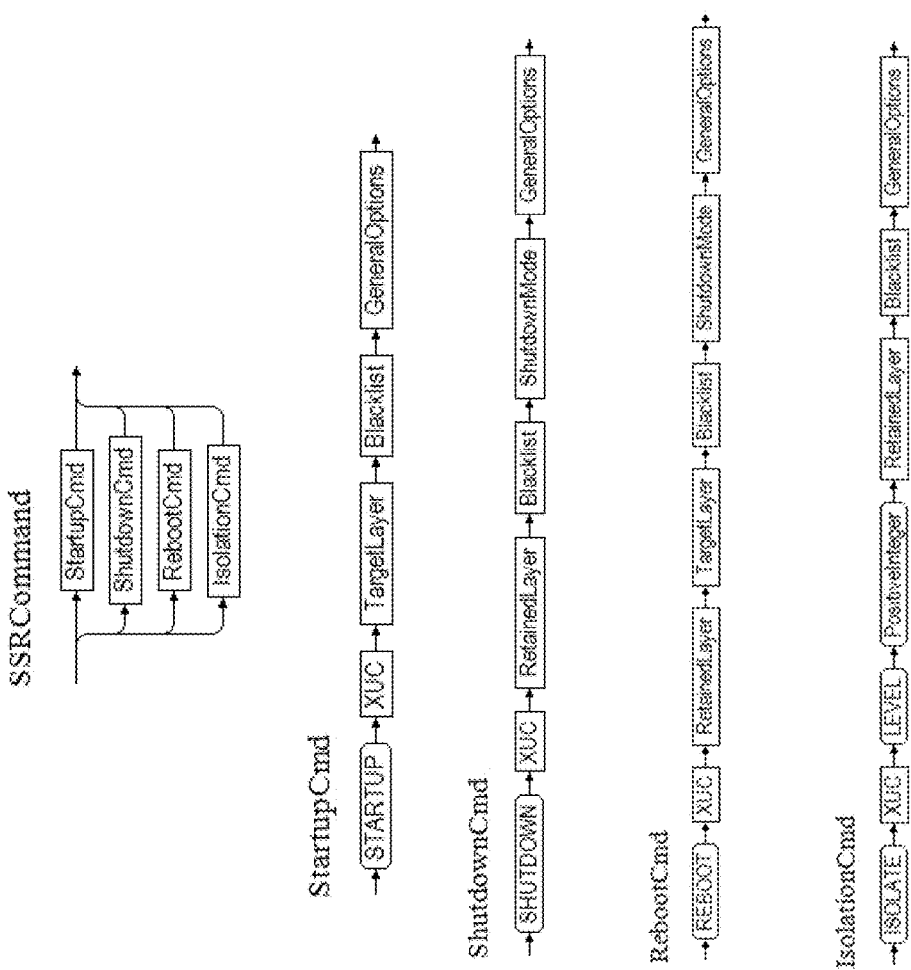

FIG. 14 illustrates a grammar for top-level SSRI commands. These commands include respective commands for Startup, Shutdown, Reboot and Isolation.

Additional characteristics and other functional features of Layer 1 and Layer 2 in illustrative embodiments will now be described with reference to FIGS. 15 and 16. It is to be appreciated that the particular listings of features provided below and elsewhere herein are not requirements, but are instead possible features of illustrative embodiments. A given embodiment can include only subsets of the listed features, and may include additional or alternative features not explicitly listed.

In the following description, listed features are once again numbered using the format x.y, where x denotes the layer number, and y denotes the feature number. It should be understood that the particular numbered features below relating to SSRI functionality for Layers 1 and 2 are distinct from similarly-numbered features provided elsewhere herein for other functionality of those layers.

Figure 15:
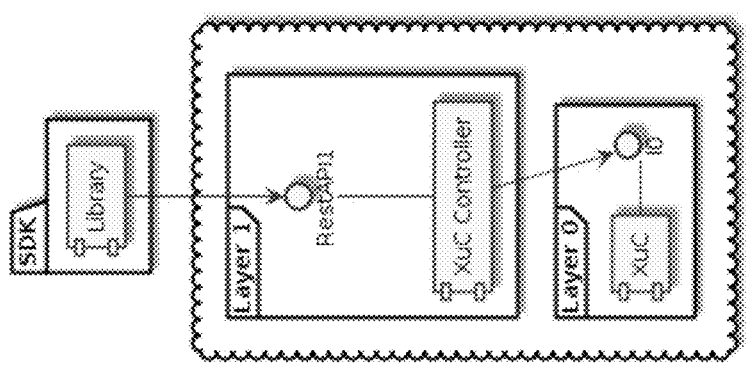
FIG. 15 illustrates a controller configured for component control in Layer 1 of the multi-layer application management architecture of FIG. 6.

FIG. 15 illustrates one possible embodiment of a component controller of Layer 1, the component control layer. Component controllers provide APIs to the higher AMS layers to harmonize the management functions of the various XuCs. The controllers are illustratively stateless, with state being kept in the AMS only in higher layers.

In order to incorporate an XuC into the SSRI functionality disclosed herein the XuC controller provides a REST (or REST-like) API that provides at least a subset of the following features:

1.1: The API includes functions for listing relevant indirectly controllable components along with their configuration. Examples include XuC instances for which no separate controller exists.

1.2: The API includes functions to list all supported SSRI functions for the XuC and relevant indirectly controllable components. This is useful as not all functions will be applicable to the XuC (and its components) and the Layer 2 controllers may have to know which functions are actually available.

1.3: The API includes functions for startup and shutdown of the XuC and relevant indirectly controllable components. The functions trigger the respective SSR operations, but do not wait for completion of such operations. For the shutdown/reboot function it should support shutdown modes and user notification wherever applicable. The function parameters should be standardized by the AMS implementation and include a parameter for advanced, XuC specific SSR options that are not covered by the standard parameter set.

1.4: The API includes functions for reboot of the XuC and relevant indirectly controllable components provided the XuC/components offer a native reboot function.

1.5: The API includes a function to query the state of the XuC and relevant indirectly controllable components.

1.6: The API includes a function to safely cancel an SSR operation if applicable to an XuC or indirectly controllable component.

1.7: The API includes a function to query XuC specific error information.

1.8: The API includes functions for the isolation of the XuC wherever applicable.

Additional details relating to the functionality of Layer 2 illustrative embodiments will now be described.

Figure 16:
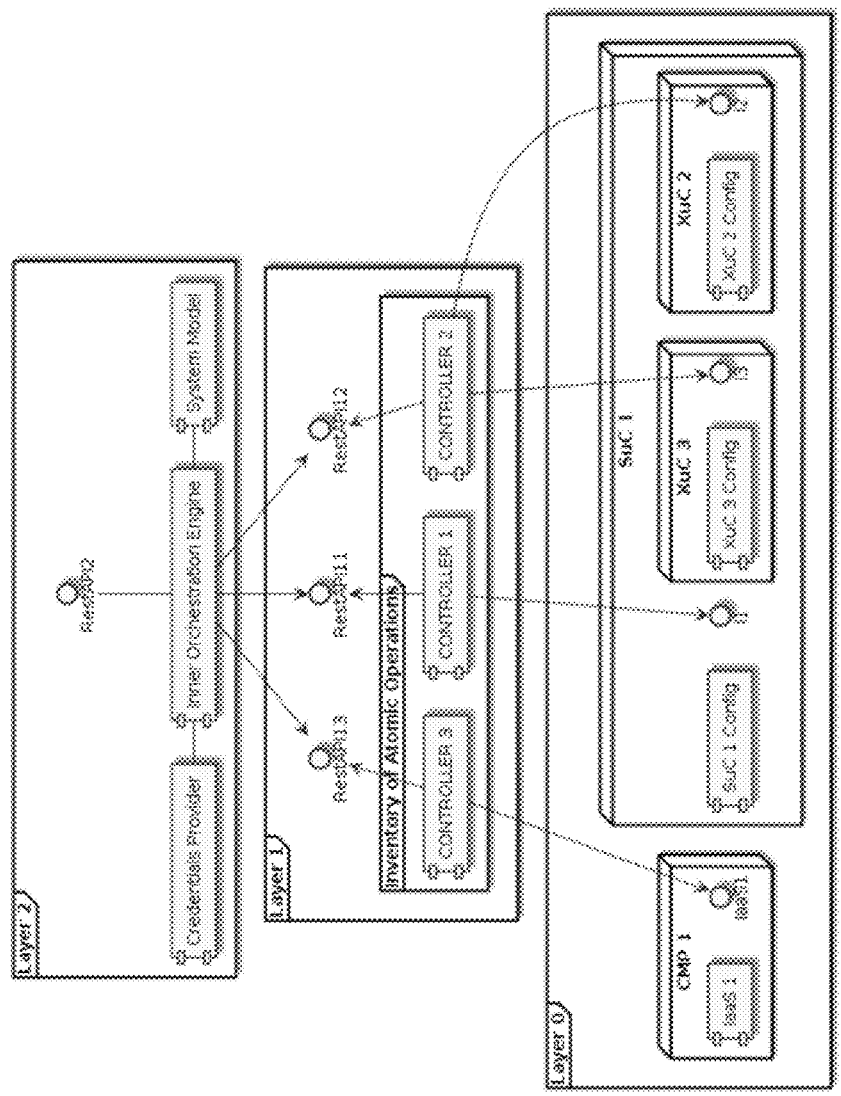
FIG. 16 illustrates an inner orchestration engine in Layer 2 of the multi-layer application management architecture of FIG. 6 and its interaction with components in Layer 1 and Layer 0.

FIG. 16 illustrates one possible embodiment of an inner orchestration engine of Layer 2, the system control and inner orchestration layer.

A given inner orchestration engine of Layer 2 comprises multiple AMS components that enable a user to manage a potentially complex SuC, such as SuC 1 of FIG. 16. It can integrate all services of all related controllers that expose atomic operations relevant for the management of the SuC, referred to herein as the "inventory of atomic operations." These can be operations directly related to the system (interface I1) or related to system components (interfaces I2, I3) or services outside the system, for example IaaS services used to control infrastructure for deployment and disposal of the system or system components.

The inner orchestration engine is illustratively associated with a particular tenant and it is assumed that it has TCP/IP network access to all Layer 1 controllers and that the Layer 1 controllers have TCP/IP network access to all components in Layer 0.

All XuCs that are under control of an instance of the inner orchestration engine are said to be in the AMD of that instance. The AMD may span multiple sites depending on the network topology of the tenant.

The inner orchestration engine is application agnostic. The orchestration logic is encoded in one or more separate system models that the AMS provider or other parties may implement. Note that such system models are not limited to application systems. They could also include entire software solutions or landscapes integrating multiple potentially complex systems. Furthermore, the inner orchestration engine can leverage a credentials provider that securely stores the credentials required to execute operations on the XuC interfaces.

With regard to SSRI functionality, the inner orchestration engine illustratively includes an API that supports the SSRI command language described above or another similar command language. The API includes at least a subset of the following features:

2.1: The API provides functions to manage the run layer configuration of the XuCs registered in the inner orchestration engine. XuCs not assigned to run layers are implicitly assigned to default run layers.

2.2: The API provides functions to manage the definition of isolation levels.

2.3: The API provides a function to query the state and configuration of all registered XuCs and relevant indirectly controllable components.

2.4: The API provides a function to query the health of all registered XuCs. This function is very useful after the startup or reboot of an XuC.

2.5: The API provides functions for synchronous as well as asynchronous execution of SSRI commands. For asynchronous processing it provides a task ID that can be used to retrieve the status of the operation. If the controller of the target XuC (or component) does not provide a reboot function, then the inner orchestration engine implements that operation (e.g., trigger shutdown, wait for status STOPPED, trigger startup, wait for status RUNNING). During the recursive execution of S SRI, the inner orchestration engine leverages available controller functions. If a requested operation is not supported but the AMS can tolerate this then it should log a warning. Otherwise if the AMS cannot tolerate a non-supported request it should treat this as an error. An example of a tolerable non-supported function is user notification.

2.6: The inner orchestration engine prevents concurrent SSRI operations on the same XuC (or indirectly controllable components).

2.7: The inner orchestration engine provides an ability to incorporate actions for pre-, post- and exception processing into the SSR process.

2.8: The API provides a function to cancel an SSR operation. Note that cancellation is not straightforward and requires a careful implementation. It also depends on the XuC whether cancellation is possible or not. Often cancellation may only be possible during the countdown period.

The particular layers, characteristics, features and other system functionality described in conjunction with the diagrams of FIGS. 2 through 16 are presented by way of illustrative example only, and should not be construed as limiting the scope of the invention in any way. Alternative embodiments can use other types and arrangements of components to implement a multi-layer architecture for application management. For example, additional or alternative characteristics or other features can be provided for each of one or more of the layers of the multi-layer architecture in other embodiments.

It is also to be appreciated that application management functionality such as that described in conjunction with the diagrams of FIGS. 2 through 16 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments can provide considerable advantages over conventional application management arrangements.

For example, challenges associated with deployment of multiple distinct applications for multiple tenants in hybrid multi-tenant clouds can be advantageously avoided through the use of an application manager configured in accordance with a multi-layer application management architecture as disclosed herein.

A multi-layer application management architecture in one or more illustrative embodiments can be used as a reference architecture for a wide variety of different application management solutions.

Such a reference architecture provides completeness along multiple dimensions of application automation. For example, it covers a full stack of potentially complex application systems, including infrastructure, OS and application, through integration of specialized Layer 1 controllers that operate on all these levels.

The multi-layer architecture in some embodiments accommodates the potentially complex nature of enterprise-grade applications such as SAP NetWeaver or others by providing a dedicated layer in the architecture that is in charge of properly modeling the topology and dependencies of such systems while still being application product agnostic.

The multi-layer architecture in some embodiments supports blueprint-based application provisioning and/or disposal, as well as additional functionality such as in-life management operations including system monitoring, configuration and/or change management.

The multi-layer architecture in some embodiments provides services for atomic operations, including inherently orchestrated operations as well as operations using explicitly engineered workflow-like orchestration.

The multi-layer architecture in some embodiments provides a service for providing credentials to controlling components.

The multi-layer architecture in some embodiments formulates functional requirements that can be used to develop microservices for highly modular and flexible application management products.

The multi-layer architecture in some embodiments provides multiple extension points in respective ones of the layers, resulting in a highly-extensible platform. Such layers can be used, for example, to extend an application management solution through the use of 3rd party implementations.

The multi-layer architecture can provide further advantages in terms of non-functional product quality criteria such as those defined in ISO 25010.

It is to be appreciated that the foregoing advantages are illustrative of advantages provided in certain embodiments, and need not be present in other embodiments.

As mentioned previously, at least portions of the information processing system 100 may be implemented using one or more processing platforms. Illustrative embodiments of such platforms will now be described in greater detail. Although described in the context of system 100, these platforms may also be used to implement at least portions of other information processing systems in other embodiments of the invention.

Figure 17:
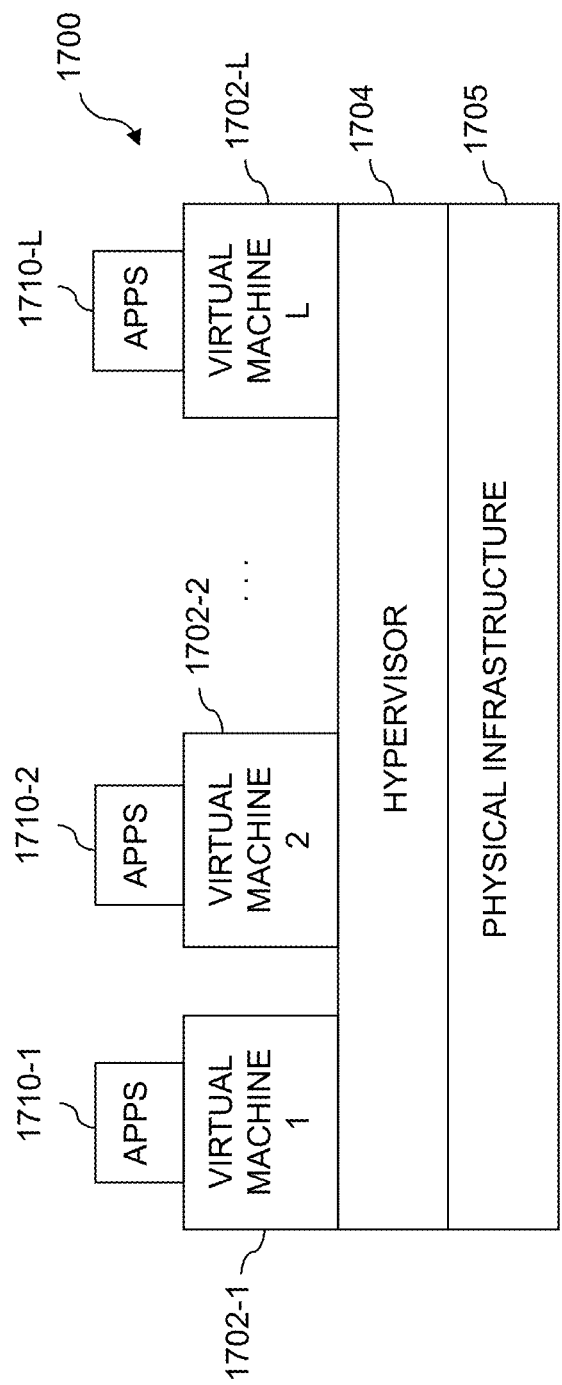
FIGS. 17 and 18 show examples of processing platforms that may be utilized to implement at least a portion of a cloud-based information processing system such as the information processing system of FIG. 1.
Figure 18:
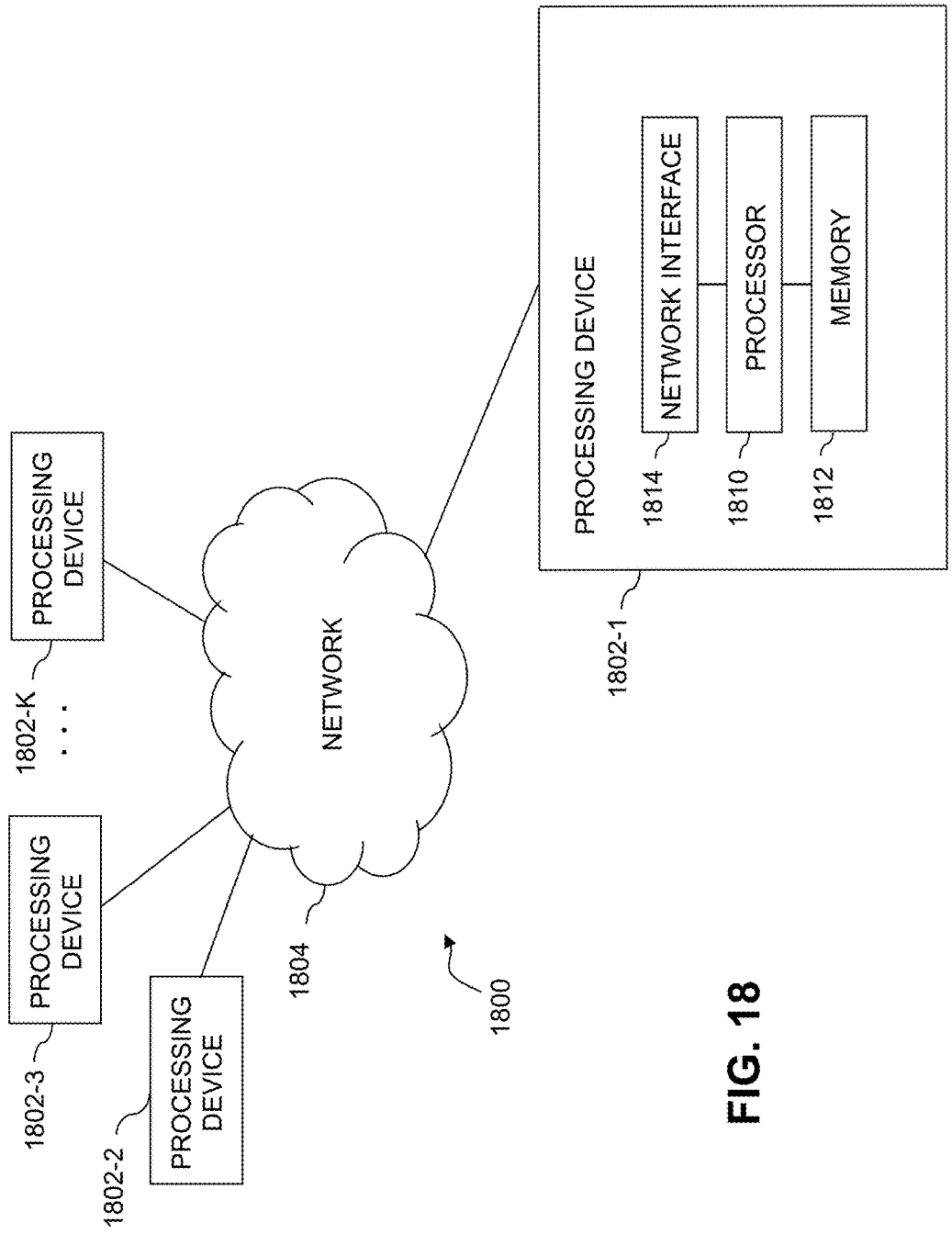

FIG. 17 shows an example processing platform comprising cloud infrastructure 1700. The cloud infrastructure 1700 comprises a combination of physical and virtual processing resources that may be utilized to implement at least a portion of the information processing system 100. The cloud infrastructure 1700 comprises virtual machines (VMs) 1702-1, 1702-2, . . . 1702-L implemented using a hypervisor 1704. The hypervisor 1704 runs on physical infrastructure 1705. The cloud infrastructure 1700 further comprises sets of applications 1710-1, 1710-2, . . . 1710-L running on respective ones of the virtual machines 1702-1, 1702-2, . . . 1702-L under the control of the hypervisor 1704.

Although only a single hypervisor 1704 is shown in the embodiment of FIG. 17, the information processing system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 1704 and possibly other portions of the information processing system 100 in one or more embodiments of the invention is the VMware® vSphere® which may have an associated virtual infrastructure management system such as the VMware® vCenter™. The underlying physical machines may comprise one or more distributed processing platforms that include one or more storage systems.

Such storage systems can comprise any of a variety of different types of storage including network-attached storage (NAS), storage area networks (SANs), direct-attached storage (DAS) and distributed DAS, as well as combinations of these and other storage types, including software-defined storage.

Particular types of storage products that can be used in implementing a given storage system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from Dell EMC. Combinations of multiple ones of these and other storage products can also be used in implementing a given storage system in an illustrative embodiment.

One or more of the processing modules or other components of system 100 may therefore each run on a computer, server, storage device or other processing platform element. A given such element may be viewed as an example of what is more generally referred to herein as a "processing device." The cloud infrastructure 1700 shown in FIG. 17 may represent at least a portion of one processing platform. Another example of such a processing platform is processing platform 1800 shown in FIG. 18.

The processing platform 1800 in this embodiment comprises a portion of system 100 and includes a plurality of processing devices, denoted 1802-1, 1802-2, 1802-3, . . . 1802-K, which communicate with one another over a network 1804.

The network 1804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1802-1 in the processing platform 1800 comprises a processor 1810 coupled to a memory 1812.

The processor 1810 may comprise a microprocessor, a microcontroller, an ASIC, a field-programmable gate array (FPGA) or other type of processing circuitry, as well as portions or combinations of such circuitry elements.

The memory 1812 may comprise random access memory (RAM), read-only memory (ROM) or other types of memory, in any combination. The memory 1812 and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1802-1 is network interface circuitry 1814, which is used to interface the processing device with the network 1804 and other system components, and may comprise conventional transceivers.

The other processing devices 1802 of the processing platform 1800 are assumed to be configured in a manner similar to that shown for processing device 1802-1 in the figure.

Again, the particular processing platform 1800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure, in place of or in addition to virtualization infrastructure comprising virtual machines. Such virtualization infrastructure illustratively includes container-based virtualization infrastructure configured to provide the above-noted Docker containers or other types of LXCs.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

It should again be emphasized that the above-described embodiments of the invention are presented for purposes of illustration only. Many variations and other alternative embodiments may be used. For example, the disclosed techniques are applicable to a wide variety of other types of information processing systems in which it is desirable to provide efficient management of applications in hybrid multi-tenant clouds and other types of cloud-based information processing systems. Also, the particular configurations of system components shown in the figures can be varied in other embodiments. Thus, for example, the particular types of processing platforms, application managers, multi-layer architectures, controllers, engines and controlled components deployed in a given embodiment and their respective configurations may be varied. Moreover, the various assumptions made above in the course of describing the illustrative embodiments should also be viewed as examples rather than as requirements or limitations of the invention. Numerous other alternative embodiments within the scope of the appended claims will be readily apparent to those skilled in the art.

What is claimed is:

1. An apparatus comprising:
a processing platform comprising a plurality of processing devices each comprising a processor coupled to a memory;
the processing platform being configured to implement virtual resources of one or more clouds for use by applications of at least one application management domain;
the processing platform further comprising an application manager configured in accordance with a multi-layer application management architecture;
wherein the virtual resources and applications comprise respective controlled components under control of a component control layer of the multi-layer application management architecture; and
wherein the applications are managed utilizing interactions between the component control layer and one or more other layers of the multi-layer application management architecture;
the application manager being further configured to implement at least one of a startup procedure, a shutdown procedure, a reboot procedure and an isolation procedure for at least a portion of each of one or more of the applications;
wherein a given instance of at least one of the startup procedure, the shutdown procedure, the reboot procedure and the isolation procedure is applied to a particular designated set of the controlled components;
the given instance of at least one of the startup procedure, the shutdown procedure, the reboot procedure and the isolation procedure being configurable under user control so as to provide a customized version of the corresponding procedure.

2. The apparatus of claim 1 wherein the multi-layer application management architecture further includes in addition to the component control layer at least:
a system control and inner orchestration layer;
an access and routing layer;
an external system orchestration layer; and
a presentation layer.

3. The apparatus of claim 2 wherein:
the system control and inner orchestration layer comprises a plurality of inner orchestration engines each associated with a different one of a plurality of application management domains and each configured to interact with a plurality of controllers of the component control layer in order to provide services that utilize controlled components of at least one system under control;
the access and routing layer comprises at least one access point of an application programming interface, a request scheduler and a request router, the access and routing layer implementing a set of functions for executing operations in the system control and inner orchestration layer on behalf of different tenants associated with different ones of the application management domains each having a different inner orchestration engine within the system control and inner orchestration layer;
the external system orchestration layer comprises at least one outer orchestration engine that executes operations in the system control and inner orchestration layer across multiple tenants via at least one access point of the access and routing layer; and
the presentation layer provides a user interface that is accessible to a user device over a network.

4. The apparatus of claim 1 wherein the particular set of controlled components subject to the given instance of at least one of the startup procedure, the shutdown procedure, the reboot procedure and the isolation procedure is defined to include controlled components associated with at least one of a host under control, a system component under control, a system under control and a landscape under control.

5. The apparatus of claim 1 wherein the given instance of at least one of the startup procedure, the shutdown procedure, the reboot procedure and the isolation procedure is configurable under user control through user selection of one or more of:
a user notification configuration of the corresponding procedure;
at least one of a plurality of modes of the corresponding procedure;
at least one of a plurality of timeout periods of the corresponding procedure; and
a user cancellation configuration of the corresponding procedure.

6. The apparatus of claim 5 wherein the given instance comprises a given instance of the shutdown procedure, the plurality of modes comprise a graceful shutdown mode, an immediate shutdown mode and a ungracious shutdown mode and the plurality of timeout periods include one or more of a shutdown countdown period, a soft escalation timeout period, a hard escalation timeout period and an ungracious shutdown period.

7. The apparatus of claim 1 wherein the given instance of at least one of the startup procedure, the shutdown procedure, the reboot procedure and the isolation procedure is configurable under user control through assignment of each of at least a subset of the controlled components of the particular designated set to different ones of a plurality of run layers specifying a sequencing of respective portions of the procedure.

8. The apparatus of claim 7 wherein the one or more of the run layers comprise respective recursive run layers.

9. The apparatus of claim 7 wherein the startup procedure is executed in ascending order of the run layers such that the startup procedure is executed for each controlled component in run layer N before executing the startup procedure for any controlled component in run layer N+1 and the shutdown procedure is executed in descending order of the run layers such that the shutdown procedure is executed for each controlled component in run layer N before executing the shutdown procedure for any controlled component in run layer N−1.

10. The apparatus of claim 1 wherein the given instance of at least one of the startup procedure, the shutdown procedure, the reboot procedure and the isolation procedure is configurable under user control through selection of at least one of a target run layer, a target isolation level and a blacklist of controlled components for the corresponding procedure.

11. The apparatus of claim 10 wherein the given instance comprises a given instance of the startup procedure and the startup procedure is executed for a specified target run layer and a specified blacklist in ascending order of run layers up to and including the target run layer for any of the controlled components assigned to those run layers but excluding any controlled components on the specified blacklist.

12. The apparatus of claim 10 wherein the given instance comprises a given instance of the shutdown procedure and the shutdown procedure is executed for a specified target layer and a specified blacklist in descending order of run layers down to and including the target run layer for any of the controlled components assigned to those run layers but excluding any controlled components on the specified blacklist.

13. The apparatus of claim 10 wherein the given instance comprises a given instance of the isolation procedure and the isolation procedure is executed for a specified target run layer, a specified target isolation level and a specified blacklist.

14. The apparatus of claim 13 wherein the isolation procedure is applied at the specified target isolation level in ascending order of run layers from the target run layer up to a maximum run layer for any of the controlled components assigned to those run layers but excluding any controlled components on the specified blacklist.

15. A method comprising:
 providing virtual resources of one or more clouds for use by applications of at least one application management domain; and
 managing the applications in accordance with a multi-layer application management architecture comprising at least a component control layer and one or more additional layers;
 wherein the virtual resources and applications comprise respective controlled components under control of the component control layer;
 wherein the applications are managed utilizing interactions between the component control layer and one or more other layers of the multi-layer application management architecture; and
 wherein managing the applications in accordance with the multi-layer application management architecture further comprises:
 implementing at least one of a startup procedure, a shutdown procedure, a reboot procedure and an isolation procedure for at least a portion of each of one or more of the applications; and
 applying a given instance of at least one of the startup procedure, the shutdown procedure, the reboot procedure and the isolation procedure to a particular designated set of the controlled components;
 the given instance of at least one of the startup procedure, the shutdown procedure, the reboot procedure and the isolation procedure being configurable under user control so as to provide a customized version of the corresponding procedure;
 wherein the method is performed in at least one processing platform comprising a plurality of processing devices each comprising a processor coupled to a memory.

16. The method of claim 15 wherein the given instance of at least one of the startup procedure, the shutdown procedure, the reboot procedure and the isolation procedure is configurable under user control through assignment of each of at least a subset of the controlled components of the particular designated set to different ones of a plurality of run layers specifying a sequencing of respective portions of the procedure.

17. The method of claim 15 wherein the given instance of at least one of the startup procedure, the shutdown procedure, the reboot procedure and the isolation procedure is configurable under user control through selection of at least one of a target run layer, a target isolation level and a blacklist of controlled components for the corresponding procedure.

18. A computer program product comprising a non-transitory processor-readable storage medium having stored therein program code of one or more software programs, wherein the program code when executed by at least one processing platform comprising a plurality of processing devices causes the processing platform:
 to provide virtual resources of one or more clouds for use by applications of at least one application management domain; and
 to manage the applications in accordance with a multi-layer application management architecture comprising a component control layer and one or more additional layers;
 wherein the virtual resources and applications comprise respective controlled components under control of the component control layer;
 wherein the applications are managed utilizing interactions between the component control layer and one or more other layers of the multi-layer application management architecture; and
 wherein in managing the applications in accordance with the multi-layer application management architecture the processing platform is further configured:
 to implement at least one of a startup procedure, a shutdown procedure, a reboot procedure and an isolation procedure for at least a portion of each of one or more of the applications; and
 to apply a given instance of at least one of the startup procedure, the shutdown procedure, the reboot procedure and the isolation procedure to a particular designated set of the controlled components;
 the given instance of at least one of the startup procedure, the shutdown procedure, the reboot procedure and the isolation procedure being configurable under user control so as to provide a customized version of the corresponding procedure.

19. The computer program product of claim 18 wherein the given instance of at least one of the startup procedure, the shutdown procedure, the reboot procedure and the isolation procedure is configurable under user control through assignment of each of at least a subset of the controlled components of the particular designated set to different ones of a plurality of run layers specifying a sequencing of respective portions of the procedure.

20. The computer program product of claim 18 wherein the given instance of at least one of the startup procedure, the shutdown procedure, the reboot procedure and the isolation procedure is configurable under user control through selection of at least one of a target run layer, a target isolation level and a blacklist of controlled components for the corresponding procedure.

\* \* \* \* \*